United States Patent
Aoki et al.

(10) Patent No.: US 8,600,594 B2
(45) Date of Patent: Dec. 3, 2013

(54) VEHICLE AND DRIVING SYSTEM FOR VEHICLE INSTALLATION

(75) Inventors: Takeshi Aoki, Nishio (JP); Kazuomi Okasaka, Nagoya (JP); Yoichi Tajima, Anjo (JP); Kiyoshiro Ueoka, Nisshin (JP)

(73) Assignees: Toyota Jidosha Kabushiki Kaisha, Toyota-Shi (JP); Aisin Aw Co., Ltd., Anjo-Shi (JP)

( * ) Notice: Subject to any disclaimer, the term of this patent is extended or adjusted under 35 U.S.C. 154(b) by 695 days.

(21) Appl. No.: 12/515,889

(22) PCT Filed: Nov. 7, 2007

(86) PCT No.: PCT/JP2007/071599
§ 371 (c)(1),
(2), (4) Date: Dec. 23, 2009

(87) PCT Pub. No.: WO2008/062665
PCT Pub. Date: May 29, 2008

(65) Prior Publication Data
US 2010/0100263 A1    Apr. 22, 2010

(30) Foreign Application Priority Data

Nov. 24, 2006 (JP) .................... 2006-316723
Jan. 5, 2007 (JP) .................... 2007-000504

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............ 701/22; 318/782; 318/430; 180/65.1; 192/219.1

(58) Field of Classification Search
USPC ................ 701/1, 22, 38, 43, 69, 103, 19, 41; 477/37, 79, 92, 93, 174, 176; 318/280, 318/432, 473, 587, 721, 782, 139, 376, 379, 318/400.09, 400.11, 400.24; 303/191, 192; 180/65.1, 65.225, 65.25, 206.2; 123/339.16, 349; 192/219.1
See application file for complete search history.

(56) References Cited

U.S. PATENT DOCUMENTS 6,114,828 A * 9/2000 Matsunaga et al. ........... 318/782
6,338,016 B1 * 1/2002 Miller et al. .................... 701/43
7,117,963 B2 * 10/2006 Saito et al. .................... 180/65.1

FOREIGN PATENT DOCUMENTS

GB     2 389 090 A    12/2003

(Continued)

OTHER PUBLICATIONS

Supplementary European Search Report, Dec. 6, 2010, EP 07831330.1.

*Primary Examiner* — Thomas Black
*Assistant Examiner* — Isaac Smith
(74) *Attorney, Agent, or Firm* — Kenyon & Kenyon LLP

(57) ABSTRACT

On condition that output of a torque of not lower than a preset reference torque from a motor continues for at least a predetermined time period in a vehicle stop state with output of a corresponding torque from the a second motor based on a detected accelerator opening, a torque command of the second motor is set to decrease the output torque of said motor by a torque decrease rate, which is set according to the corresponding torque and the accelerator opening in the vehicle stop state (initial accelerator opening). After a changeover of a current crowding phase in the second motor, the torque command of said motor is set to increase the output torque of said motor by a torque increase rate, which is set according to the accelerator opening in the vehicle stop state.

5 Claims, 12 Drawing Sheets

(56) References Cited

FOREIGN PATENT DOCUMENTS

| | | |
|---|---|---|
| JP | 09-215388 A | 8/1997 |
| JP | 11-215687 A | 8/1999 |
| JP | 2004-129411 A | 4/2004 |
| JP | 2004-248433 A | 9/2004 |
| JP | 2005-045863 A | 2/2005 |
| JP | 2005-185065 A | 7/2005 |
| JP | 2006-050704 A | 2/2006 |
| JP | 2007-329982 A | 12/2007 |
| WO | 94/18026 A1 | 8/1994 |
| WO | WO 2005/025923 A1 | 3/2005 |

* cited by examiner

VEHICLE AND DRIVING SYSTEM FOR VEHICLE INSTALLATION

This is a 371 national phase application of PCT/JP2007/071599 filed 7 Nov. 2007, claiming priority to Japanese Patent Applications No. JP 2006-316723 filed 24 Nov. 2006, and No. JP 2007-000504 filed 5 Jan. 2007, respectively, the contents of which are incorporated herein by reference.

TECHNICAL FIELD

The present invention relates to a vehicle and a driving system for vehicle installation.

BACKGROUND ART

One proposed structure of the vehicle includes an engine, a planetary gear mechanism having a carrier connected to a crankshaft of the engine and a ring gear linked with an axle, a first motor having a rotating shaft connected with a sun gear of the planetary gear mechanism, and a second motor having a rotating shaft connected with the ring gear of the planetary gear mechanism (see, for example, Patent Document 1).
Patent Document 1: Japanese Patent Laid-Open No. H11-215687

Another proposed structure of the vehicle is driven with output power of a motor (see, for example, Patent Document 2). In a vehicle stop state on an upslope with the accelerator opening kept at a substantially constant level, that is, in a current crowding state of the vehicle with concentric flow of electric current only in one specific phase among the respective coil phases of the motor, the output torque of the motor is decreased by a predetermined rate to move the vehicle back and release the vehicle from the current crowding state. Such control aims to restrict heat generation in the motor and in the driving circuit.
Patent Document 2: Japanese Patent Laid-Open No. 20005-45863

DISCLOSURE OF THE INVENTION

In the former prior art vehicle discussed above, when the rotation speed of the second motor is kept approximately equal to 0, for example, in the vehicle stop state on an upslope with the accelerator opening kept at a substantially constant level, the electric current may concentrically flow in only one specific phase among the respective coil phases of the second motor. This may accelerate heat generation in the second motor and in its driving circuit. Continuation of the accelerated heat generation in the second motor and in the driving circuit may cause a heat-induced damage in the second motor or in the driving circuit. It is thus desirable to perform the control of releasing the vehicle from this state immediately and thereby restrict heat generation in the second motor and in the driving circuit.

In the latter prior art vehicle discussed above, after the back motion of the vehicle by the control of decreasing the output torque of the motor, torque increase control of increasing the output torque of the motor is performed to stop the vehicle. In the torque increase control, a slow increase of the output torque of the motor does not ensure a quick response of the motor for outputting a torque based on the driver's driving demand to the driver's subsequent depression of the accelerator pedal. The driver accordingly feels disappointingly slow torque output. In the torque increase control, it is thus required to perform the control by taking into account the driver's driving demand.

In the vehicle and the driving system for vehicle installation, there would thus be a demand for restricting heat generation in a motor. In the vehicle and the driving system for vehicle installation, there would also be a demand for performing control by taking into account the driver's driving demand.

The present invention accomplishes at least part of the demands mentioned above and the other relevant demands by the following configurations applied to the vehicle and the driving system for vehicle installation.

According to one aspect, the present invention is directed to a first vehicle equipped with a motor arranged to output power to an axle. The first vehicle has: an accelerator operation amount detector configured to detect a driver's accelerator operation amount; a decrease rate setting module configured to set a decrease rate of an output torque from the motor, based on the detected accelerator operation amount; an increase rate setting module configured to set an increase rate of the output torque from the motor, based on the detected accelerator operation amount; and a controller configured to, on condition that there is no substantial change of the detected accelerator operation amount and that a predetermined torque decrease increase condition is satisfied in a vehicle stop state with output of a corresponding torque based on the detected accelerator operation amount from the motor, control the motor to decrease the output torque of the motor by the set decrease rate until a preset back motion of the vehicle and to increase the output torque of the motor up to the corresponding torque by the set increase rate after the preset back motion of the vehicle.

On condition that there is no substantial change of the detected accelerator operation amount and that the predetermined torque decrease increase condition is satisfied in the vehicle stop state with output of the corresponding torque based on the detected accelerator operation amount from the motor, the first vehicle according to the above aspect of the invention controls the motor to decrease the output torque of the motor by the decrease rate set based on the driver's accelerator operation amount until the preset back motion of the vehicle. The terminology of 'preset back motion' includes a back motion to a certain extent that causes a changeover of a current crowding phase among respective coil phases of the motor. The vehicle may thus be moved back until a changeover of the current crowding phase among the respective coil phases of the motor. Such back motion of the vehicle releases the vehicle from the vehicle stop state with output of the corresponding torque based on the driver's accelerator operation amount from the motor and thereby restricts heat generation in the motor. The output torque of the motor is decreased by taking into account the driver's accelerator operation amount. This arrangement thus ensures the control by taking into account the driver's driving demand. After the preset back motion of the vehicle, the first vehicle controls the motor to increase the output torque of the motor up to the corresponding torque by the increase rate set based on the driver's accelerator operation amount. The output torque of the motor is increased by taking into account the driver's accelerator operation amount. This arrangement thus ensures the control by taking into account the driver's driving demand.

In one preferable application of the first vehicle according to the above aspect of the invention, the decrease rate setting module sets the decrease rate to have an increasing tendency with an increase of the detected accelerator operation amount. The preset back motion of the vehicle is thus achieved more quickly against the greater accelerator operation amount or the driver's greater driving demand. This enables the vehicle to be released immediately from the vehicle stop state with output of the corresponding torque based on the driver's accelerator operation amount from the motor. In this application, the decrease rate is set to have a decreasing tendency with a decrease of the detected accelerator operation amount. This moves the vehicle back slowly and improves the ride quality.

In another preferable application of the first vehicle according to the above aspect of the invention, the decrease rate setting module sets the decrease rate to have an increasing tendency with an increase of the corresponding torque. The higher corresponding torque increases the amount of electric current flowing through the motor and accelerates heat generation in the motor. Setting the decrease rate to have an increasing tendency with an increase of the corresponding torque enables the output torque of the motor to be decreased rapidly. This arrangement ensures quick achievement of the preset back motion of the vehicle and thus enables the vehicle to be released immediately from the vehicle stop state with output of the corresponding torque based on the driver's accelerator operation amount from the motor.

In still another preferable application of the first vehicle according to the above aspect of the invention, the increase rate setting module sets the increase rate to have an increasing tendency with an increase of the detected accelerator operation amount. The output torque of the motor is increased up to the corresponding torque more rapidly against the greater accelerator operation amount. This arrangement ensures a quicker response of the motor for outputting the torque based on the driver's driving demand to the driver's subsequent depression of the accelerator pedal.

In one preferable application of the first vehicle according to the above aspect of the invention, the predetermined torque decrease increase condition is that output of a torque of not lower than a preset reference torque from the motor continues for at least a predetermined time period.

In one preferable embodiment of the invention, the first vehicle of the above aspect further has an internal combustion engine arranged to output power to the axle. This arrangement ensures the restriction of heat generation in the motor and the control by taking into account the driver's deriving demand in the vehicle equipped with both the internal combustion engine and the motor.

According to another aspect, the present invention is directed to a second vehicle equipped with a motor arranged to output power to an axle. The second vehicle has: an accelerator operation amount detector configured to detect a driver's accelerator operation amount; a gradient-reflecting physical quantity detector configured to detect a gradient-reflecting physical quantity or a physical quantity reflecting a road surface slope; a driving force demand setting module configured to set a driving force demand required for driving the vehicle, based on the detected accelerator operation amount; and a controller configured to control the motor to output a torque based on the set driving force demand and, on condition that there is no substantial change of the detected accelerator operation amount and that a predetermined torque decrease increase condition is satisfied in a substantial vehicle stop state, control the motor to decrease the output torque of the motor by a first change rate until a preset back motion of the vehicle and to increase the output torque of the motor by a second change rate based on the detected accelerator operation amount and the detected gradient-reflecting physical quantity after the preset back motion of the vehicle.

On condition that there is no substantial change of the detected accelerator operation amount and that the predetermined torque decrease increase condition is satisfied in the substantial vehicle stop state, the second vehicle according to the above aspect of the invention controls the motor to decrease the output torque of the motor by the first change rate until the preset back motion of the vehicle and to increase the output torque of the motor by the second change rate based on the detected accelerator operation amount and the detected gradient-reflecting physical quantity after the preset back motion of the vehicle. The smaller amount of accelerator operation generally suggests the driver's smaller driving demand. On condition that the vehicle stops on the road surface of a gentle slope, the small amount of accelerator operation may reflect not the driver's vehicle stop request but the driver's driving demand. On condition that the vehicle stops on the road surface of a steep slope, on the other hand, the large amount of accelerator operation may reflect not the driver's driving demand but the driver's vehicle stop request. Increasing the output torque of the motor by the second change rate based on the detected accelerator operation amount and the detected gradient-reflecting physical quantity after the preset back motion of the vehicle assures the control by taking into account the driver's driving demand. The terminology of 'preset back motion' includes a back motion to a certain extent that causes a changeover of a current crowding phase among respective coil phases of the motor.

In one preferable application of the second vehicle according to the above aspect of the invention, the second change rate is set to have an increasing tendency with a decrease of the road surface slope estimated by the detected gradient-reflecting physical quantity and with an increase of the detected accelerator operation amount. Under the condition of a fixed accelerator operation amount, the gentler slope of the road surface is expected to suggest the driver's greater driving demand. Under the condition of a fixed slope of the road surface, the greater accelerator operation amount is expected to suggest the driver's greater driving demand. Setting the second change rate to have an increasing tendency with a decrease of the road surface slope and with an increase of the detected accelerator operation amount or the driver's driving demand enables the output torque of the motor to be increased more rapidly. This arrangement ensures a quicker response of the motor for outputting the torque based on the driver's driving demand to the driver's subsequent depression of the accelerator pedal. In this application, the second change rate is set to have a decreasing tendency with an increase of the road surface slope and with a decrease of the detected accelerator operation amount. This slowly increases the output torque of the motor and improves the ride quality.

In one preferable embodiment of the second vehicle according to the above aspect of the invention, the first change rate is set based on the detected accelerator operation amount. In another preferable embodiment of the second vehicle according to the above aspect of the invention, the first change rate is set based on the set driving force demand. Such setting ensures the control of decreasing, the output torque of the motor by taking into account the driver's driving demand. In one application of the former embodiment, the first change rate may be set to have an increasing tendency with an increase of the detected accelerator operation amount. The vehicle is thus moved back more rapidly against the greater accelerator operation amount or the driver's greater driving demand, so as to restrict heat generation in the motor more quickly. In this application, the first change rate is set to have a decreasing tendency with a decrease of the detected accelerator operation amount. This arrangement moves the vehicle back slowly and improves the ride quality. In one application of the latter embodiment, the first change rate may be set to have an increasing tendency with an increase of a torque demand, which is to be output from the motor and is set based on the set driving force demand. The vehicle is thus moved back more rapidly against the greater torque demand to be output from the motor or the greater amount of electric current flowing through the motor, so as to restrict heat generation in the motor more quickly.

In one preferable application of the second vehicle according to the above aspect of the invention, the predetermined torque decrease increase condition is that output of a torque of not lower than a preset reference torque from the motor continues for at least a predetermined time period.

In one preferable embodiment of the invention, the second vehicle of the above aspect further has an internal combustion engine arranged to output power to the axle. This arrangement ensures the restriction of heat generation in the motor and the control by taking into account the driver's deriving demand in the vehicle equipped with both the internal combustion engine and the motor.

According to another aspect, the present invention is also directed to a first driving system that is installed on a vehicle and equipped with a motor arranged to output power to an axle, the driving system including: an accelerator operation amount detector configured to detect a driver's accelerator operation amount; a decrease rate setting module configured to set a decrease rate of an output torque from the motor, based on the detected accelerator operation amount; an increase rate setting module configured to set an increase rate of the output torque from the motor, based on the detected accelerator operation amount; and a controller configured to, on condition that there is no substantial change of the detected accelerator operation amount and that a predetermined torque decrease increase condition is satisfied in a vehicle stop state with output of a corresponding torque based on the detected accelerator operation amount from the motor, control the motor to decrease the output torque of the motor by the set decrease rate until a preset back motion of the vehicle and to increase the output torque of the motor up to the corresponding torque by the set increase rate after the preset back motion of the vehicle.

On condition that there is no substantial change of the detected accelerator operation amount and that the predetermined torque decrease increase condition is satisfied in the vehicle stop state with output of the corresponding torque based on the detected accelerator operation amount from the motor, the first driving system according to the above aspect of the invention controls the motor to decrease the output torque of the motor by the decrease rate set based on the driver's accelerator operation amount until the preset back motion of the vehicle. The terminology of 'preset back motion' includes a back motion to a certain extent that causes a changeover of a current crowding phase among respective coil phases of the motor. The vehicle may thus be moved back until a changeover of the current crowding phase among the respectively coil phases of the motor. Such back motion of the vehicle releases the vehicle from the vehicle stop state with output of the corresponding torque based on the driver's accelerator operation amount from the motor and thereby restricts heat generation in the motor. The output torque of the motor is decreased by taking into account the driver's accelerator operation amount. This arrangement thus ensures the control by taking into account the driver's driving demand. After the preset back motion of the vehicle, the first driving system controls the motor to increase the output torque of the motor up to the corresponding torque by the increase rate set based on the driver's accelerator operation amount. The output torque of the motor is increased by taking into account the driver's accelerator operation amount. This arrangement thus ensures the control by taking into account the driver's driving demand.

According to another aspect, the present invention is also directed to a second driving system that is installed on a vehicle and equipped with a motor arranged to output power to an axle, the driving system including: an accelerator operation amount detector configured to detect a driver's accelerator operation amount; a gradient-reflecting physical quantity detector configured to detect a gradient-reflecting physical quantity or a physical quantity reflecting a road surface slope; a driving force demand setting module configured to set a driving force demand required for driving the vehicle, based on the detected accelerator operation amount; and a controller configured to control the motor to output a torque based on the set driving force demand and, on condition that there is no substantial change of the detected accelerator operation amount and that a predetermined torque decrease increase condition is satisfied in a substantial vehicle stop state, control the motor to decrease the output torque of the motor by a first change rate until a preset back motion of the vehicle and to increase the output torque of the motor by a second change rate based on the detected accelerator operation amount and the detected gradient-reflecting physical quantity after the preset back motion of the vehicle.

On condition that there is no substantial change of the detected accelerator operation amount and that the predetermined torque decrease increase condition is satisfied in the substantial vehicle stop state, the second driving system according to the above aspect of the invention controls the motor to decrease the output torque of the motor by the first change rate until the preset back motion of the vehicle and to increase the output torque of the motor by the second change rate based on the detected accelerator operation amount and the detected gradient-reflecting physical quantity after the preset back motion of the vehicle. The smaller amount of accelerator operation generally suggests the driver's smaller driving demand. On condition that the vehicle stops on the road surface of a gentle slope, the small amount of accelerator operation may reflect not the driver's vehicle stop request but the driver's driving demand. On condition that the vehicle stops on the road surface of a steep slope, on the other hand, the large amount of accelerator operation may reflect not the driver's driving demand but the driver's vehicle stop request. Increasing the output torque of the motor by the second change rate based on the detected accelerator operation amount and the detected gradient-reflecting physical quantity after the preset back motion of the vehicle assures the control by taking into account the driver's driving demand. The terminology of 'preset back motion' includes a back motion to a certain extent that causes a changeover of a current crowding phase among respective coil phases of the motor.

The present invention described above as the first vehicle can be also actualized as a first control method of a vehicle. The first control method according to this aspect of the invention is a method for a vehicle equipped with a motor arranged to output power to an axle, the first control method including the step of: on condition that there is no substantial change of a driver's accelerator operation amount and that a predetermined torque decrease increase condition is satisfied in a vehicle stop state with output of a corresponding torque based on the accelerator operation amount from the motor, controlling the motor to decrease output torque of the motor by a decrease rate determined based on the accelerator operation amount until a preset back motion of the vehicle, and to increase the output torque of the motor up to the corresponding torque by an increase rate determined based on the accelerator operation amount after the preset back motion of the vehicle.

On condition that there is no substantial change of the detected accelerator operation amount and that the predetermined torque decrease increase condition is satisfied in the vehicle stop state with output of the corresponding torque based on the detected accelerator operation amount from the motor, the first control method according to the above aspect of the invention controls the motor to decrease the output torque of the motor by the decrease rate set based on the driver's accelerator operation amount until the preset back motion of the vehicle. The terminology of 'preset back motion' includes a back motion to a certain extent that causes a changeover of a current crowding phase among respective coil phases of the motor. The vehicle may thus be moved back until a changeover of the current crowding phase among the respectively coil phases of the motor. Such back motion of the vehicle releases the vehicle from the vehicle stop state with output of the corresponding torque based on the driver's accelerator operation amount from the motor and thereby restricts heat generation in the motor. The output torque of the motor is decreased by taking into account the driver's accelerator operation amount. This arrangement thus ensures the control by taking into account the driver's driving demand. After the preset back motion of the vehicle, the first control method controls the motor to increase the output torque of the motor up to the corresponding torque by the increase rate set based on the driver's accelerator operation amount. The output torque of the motor is increased by taking into account the driver's accelerator operation amount. This arrangement thus ensures the control by taking into account the driver's driving demand.

The present invention described above as the second vehicle can similarly be actualized as a second control method of a vehicle. The second control method according to this aspect of the invention is a method for a vehicle equipped with a motor arranged to output power to an axle, the vehicle including: an accelerator operation amount detector configured to detect a driver's accelerator operation amount; a gradient-reflecting physical quantity detector configured to detect a gradient-reflecting physical quantity or a physical quantity reflecting a road surface slope; and a driving force demand setting module configured to set a driving force demand required for driving the vehicle, based on the detected accelerator operation amount, the second control method including the step of: controlling the motor to output a torque based on the set driving force demand and, on condition that there is no substantial change of the detected accelerator operation amount and that a predetermined torque decrease increase condition is satisfied in a substantial vehicle stop state, control the motor to decrease the output torque of the motor by a first change rate until a preset back motion of the vehicle and to increase the output torque of the motor by a second change rate based on the detected accelerator operation amount and the detected gradient-reflecting physical quantity after the preset back motion of the vehicle.

On condition that there is no substantial change of the detected accelerator operation amount and that the predetermined torque decrease increase condition is satisfied in the substantial vehicle stop state, the second control method according to the above aspect of the invention controls the motor to decrease the output torque of the motor by the first change rate until the preset back motion of the vehicle and to increase the output torque of the motor by the second change rate based on the detected accelerator operation amount and the detected gradient-reflecting physical quantity after the preset back motion of the vehicle. The smaller amount of accelerator operation generally suggests the driver's smaller driving demand. On condition that the vehicle stops on the road surface of a gentle slope, the small amount of accelerator operation may reflect not the driver's vehicle stop request but the driver's driving demand. On condition that the vehicle stops on the road surface of a steep slope, on the other hand, the large amount of accelerator operation may reflect not the driver's driving demand but the driver's vehicle stop request. Increasing the output torque of the motor by the second change rate based on the detected accelerator operation amount and the detected gradient-reflecting physical quantity after the preset back motion of the vehicle assures the control by taking into account the driver's driving demand. The terminology of 'preset back motion' includes a back motion to a certain extent that causes a changeover of a current crowding phase among respective coil phases of the motor.

The present invention described above as the first and second driving system can similarly be actualized as a control method of a driving system.

BEST MODES OF CARRYING OUT THE INVENTION

Figure 1:
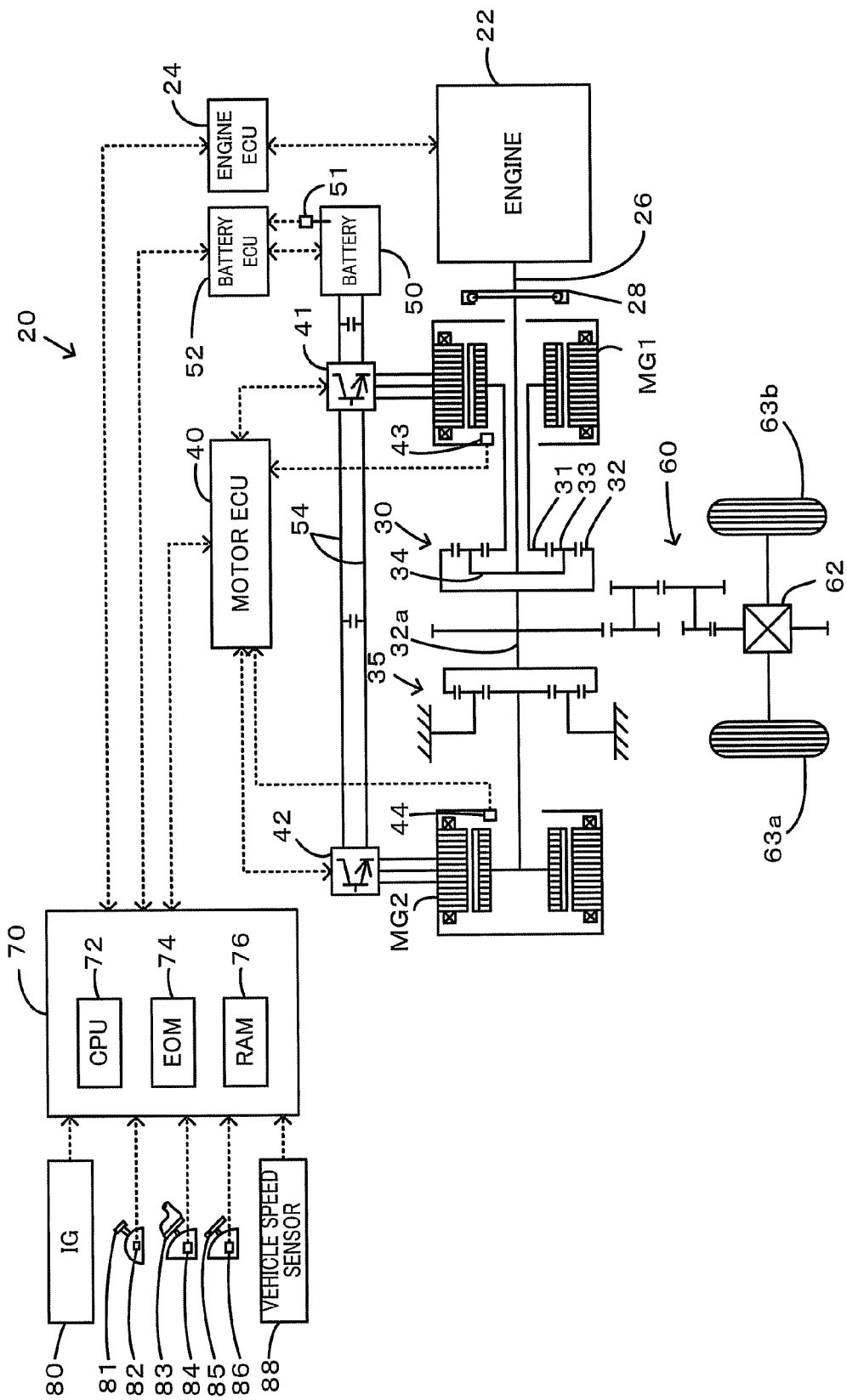
FIG. 1 schematically illustrates the configuration of a hybrid vehicle 20 in a first embodiment of the invention.

Some modes of carrying out the invention are described below as preferred embodiments. FIG. 1 schematically illustrates the configuration of a hybrid vehicle 20 in a first embodiment of the invention. As illustrated, the hybrid vehicle 20 of the first embodiment includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the driving system of the hybrid vehicle 20.

The engine 22 is an internal combustion engine that consumes a hydrocarbon fuel, such as gasoline or light oil, to output power. The engine 22 is under operation controls, such as fuel injection control, ignition control, and intake air amount regulation control, by an engine electronic control unit 24 (hereafter referred to as engine ECU 24) that inputs signals from various sensors detecting the operation state of the engine 22. The engine ECU 40 communicates with the hybrid electronic control unit 70 to control operations of the engine 22 in response to control signals transmitted from the hybrid electronic control unit 70, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, rotational positions θm1 and θm2 of rotors in the motors MG1 and MG2 from rotational position detection sensors 43 and 44 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50. The battery ECU 52 also calculates input and output limits Win and Wout of the battery 50 as input and output limits of charge/discharge of the battery 50 based on the state of charge (SOC) of the battery 50 and the battery temperature Tb of the battery 50 detected by the temperature sensor 51.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
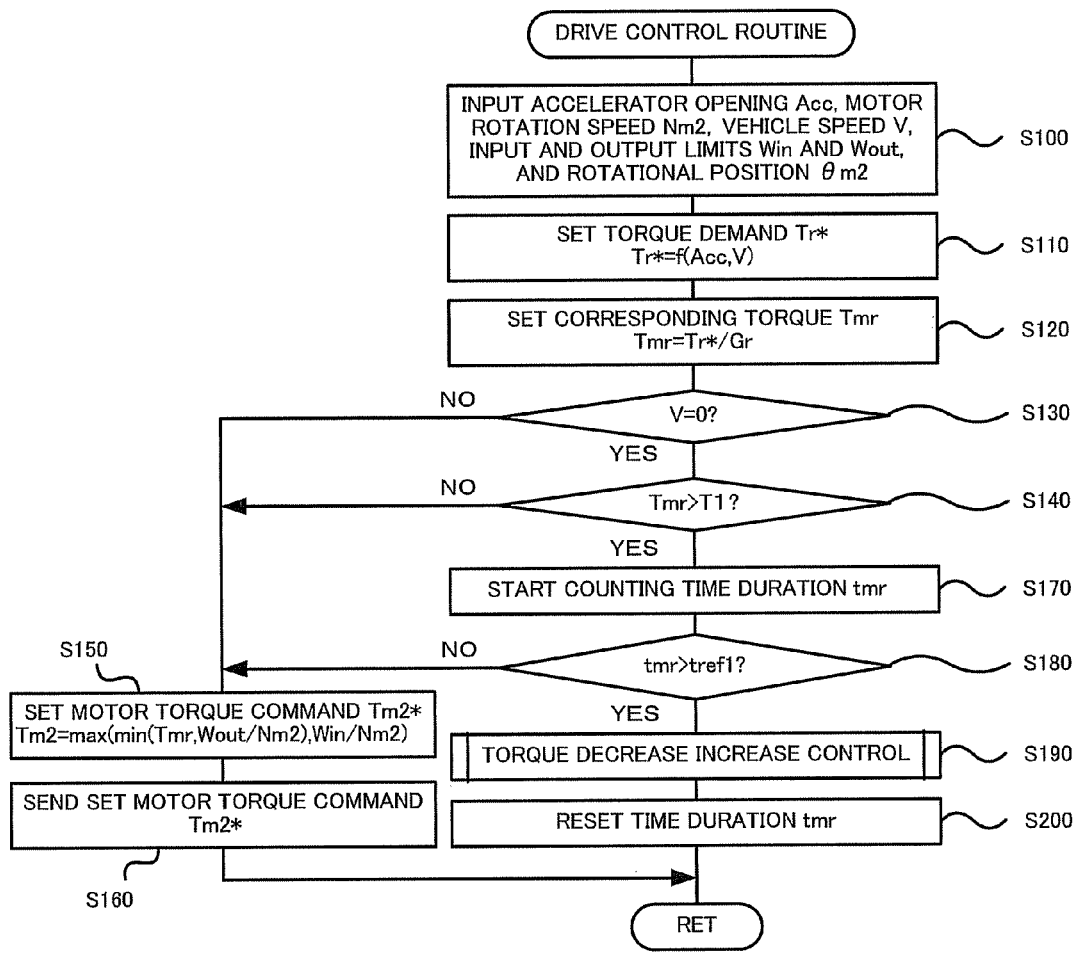
FIG. 2 is a flowchart showing a drive control routine executed by a hybrid electronic control unit 70 in the first embodiment.

The following describes the operations of the hybrid vehicle 20 of the first embodiment having the configuration discussed above, especially series of processing at a vehicle stop with output of a torque from the motor MG2 corresponding to the driver's accelerator operation. FIG. 2 is a flowchart showing a drive control routine executed by the hybrid electronic control unit 70. This routine is repeatedly performed at preset time intervals (for example, at every several msec) except the processing of steps S190 and S200. It is here assumed that the hybrid vehicle 20 is under operation control in the motor drive mode to ensure output of a power equivalent to a power demand from the motor MG2 to the ring gear shaft 32a at an operation stop of the engine 22 on an upslope.

In the drive control routine, the CPU 72 of the hybrid electronic control unit 70 first inputs various data required for control, for example, the accelerator opening Acc from the accelerator pedal position sensor 84, the vehicle speed V from the vehicle speed sensor 88, the rotational position θm2 of the rotor in the motor MG2, a rotation speed Nm2 of the motor MG2, and input and output limits Win and Wout of the battery 50 (step S100). The rotational position θm2 of the rotor in the motor MG2 is detected by the rotational position detector sensor 44 and is input from the motor ECU 40 by communication. The rotation speed Nm2 of the motor MG2 is computed from the rotational position θm2 of the rotor in the motor MG2 detected by the rotational position detection sensor 44 and is input from the motor ECU 40 by communication. The input limit Win and the output limit Wout of the battery 50 are set according to the battery temperature Tb of the battery 50 measured by the temperature sensor 51 and the state of charge (SOC) of the battery 50 and are input from the battery ECU 52 by communication.

Figure 3:
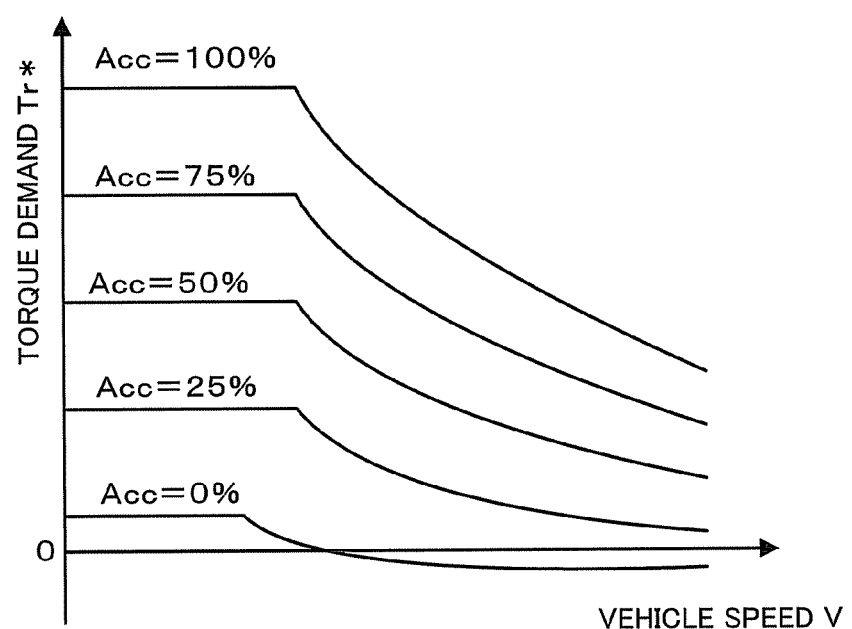
FIG. 3 shows an example of a torque demand setting map.

After the data input, the CPU 72 sets a torque demand Tr* to be output to the ring gear shaft 32a or the driveshaft linked with the drive wheels 63a and 63b, based on the input accelerator opening Acc and the input vehicle speed V (step S110). A concrete procedure of setting the torque demand Tr* in the first embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 3.

After setting the torque demand Tr*, a torque value obtained by dividing the set torque demand Tr* by a gear ratio Gr of the reduction gear 35 is set to a corresponding torque Tmr to be output from the motor MG2 for ensuring output of the torque demand Tr* to the ring gear shaft 32a or the driveshaft (step S120). Since the torque demand Tr* is set based on the accelerator opening Acc, the corresponding torque Tmr is also based on the accelerator opening Acc.

The CPU 72 subsequently determines whether the vehicle is at stop by referring to the input vehicle speed V (step S130), and compares the corresponding torque Tmr with a preset reference value T1 as an upper limit torque in an acceptable range of heat generation in the motor MG2 and in the inverter 41 (step S140). When the vehicle is not at stop, the CPU 72 determines that the vehicle is not in a current crowding state with concentric flow of electric current in a specific phase among the respective coil phases of the motor MG2 and is thus to be subjected to ordinary control. The CPU 72 accordingly restricts the corresponding torque Tmr with the respective results of divisions of the input limit Win and the output limit Wout of the battery 50 by the rotation speed Nm2 of the motor MG2 and sets the restricted torque to a torque command Tm2* of the motor MG2 (step S150). The CPU 72 sends the set torque command Tm2* of the motor MG2 to the motor ECU 40 (step S160) and exits from this routine. The motor ECU 40 receives the torque command Tm2* and performs switching control of switching elements included in the inverters 41 and 42 to drive the motor MG2 with the torque command Tm2*. Namely in the vehicle that is not at stop, the control is performed to ensure output of the corresponding torque Tmr based on the accelerator opening Acc from the motor MG2 to the ring gear shaft 32a or the driveshaft within the range of the input limit Win and the output limit Wout of the battery 50.

In the vehicle stop state, when the corresponding torque Tmr is not higher than the preset reference value T1 (steps S130 and S140), the CPU 72 determines that the vehicle is in the current crowding state but permits output of the corresponding torque Tmr from the motor MG2 due to a low torque demand to be output from the motor MG2. The CPU 72 accordingly sets the torque command Tm2* by restricting the corresponding torque Tmr with the respective results of divisions of the input limit Win and the output limit Wout of the battery 50 by the rotation speed Nm2 of the motor MG2 and sends the set torque command Tm2* of the motor MG2 to the motor ECU 40 (steps S150 and S160), before exiting from the routine.

In the vehicle stop state, when the corresponding torque Tmr is higher than the preset reference value T1 (steps S130 and S140), on the other hand, the CPU 72 starts, if not yet started, counting a time duration tmr, which represents continuance of the state having the corresponding torque Tmr of higher than the preset reference value T1 (step S170). The time duration tmr is then compared with a preset reference time tref1 as an upper limit duration of output of the corresponding torque Tmr from the motor MG2 in an acceptable range of heat generation in the motor MG2 and in the inverter 41 (step S180). When the time duration tmr is not longer than the preset reference time tref1, the CPU 72 identifies only the short continuance of the state having the corresponding torque Tmr of higher than the preset reference value T1. The CPU 72 accordingly sets the torque command Tm2* by restricting the corresponding torque Tmr with the respective results of divisions of the input limit Win and the output limit Wout of the battery 50 by the rotation speed Nm2 of the motor MG2 and sends the set torque command Tm2* of the motor MG2 to the motor ECU 40 (steps S150 and S160), before exiting from the routine. Even in the current crowding state of the vehicle with a high torque demand to be output from the motor MG2, when the time duration tmr of the state having the corresponding torque Tmr of higher than the preset reference value T1 is not longer than the preset reference time tref1, the control is continued to continuously output the corresponding torque Tmr based on the accelerator opening Acc from the motor MG2 to the ring gear shaft 32a or the driveshaft within the range of the output limit Wout of the battery 50.

When the time duration tmr is longer than the preset reference time tref1, on the other hand, it is determined that the continuous output of the corresponding torque Tmr from the motor MG2 may cause a heat-induced damage of the motor MG2 or of the inverter 41. The drive control routine then executes torque decrease increase control (step S190) as described below in detail, resets the time duration tmr (step S200), and is terminated.

Figure 4:
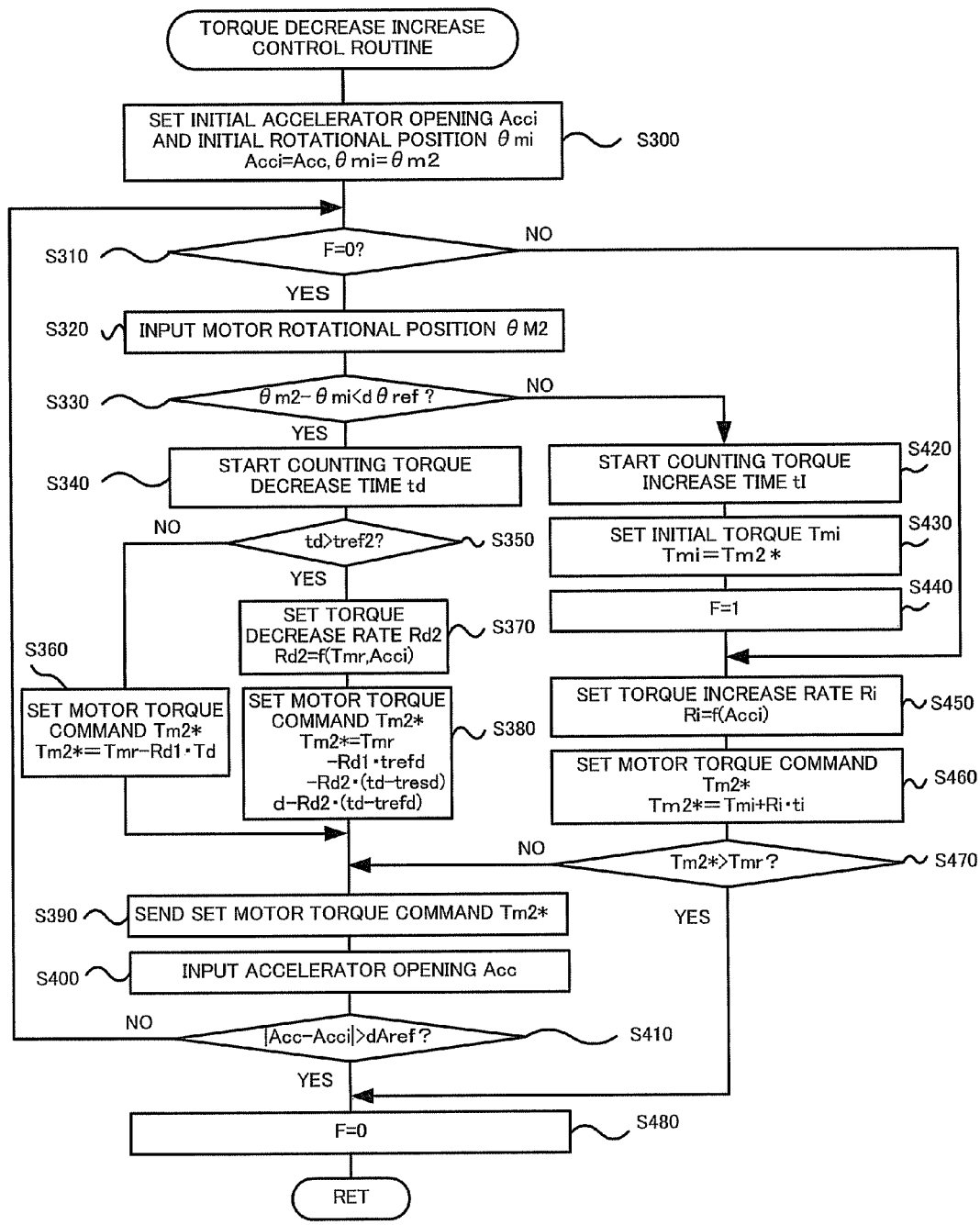
FIG. 4 is a flowchart showing the details of a torque decrease increase control executed by the hybrid electronic control unit 70 in the first embodiment.

The torque decrease increase control performed at step S190 is explained in detail. FIG. 4 is a flowchart showing the details of the torque decrease increase control. In the torque decrease increase control routine, the CPU 72 first sets the accelerator opening Acc and the rotational position θm2 of the rotor in the motor MG2 input at step S100 in the drive control routine of FIG. 2 to an initial accelerator opening Acci and an initial rotational position θmi as the initial values of the accelerator opening and the rotational position of the rotor in the motor MG2 on a start of this routine (step S300). It is then identified whether a flag is set equal to 0 (step S310). The flag is set to 1 during control of increasing the torque output from the motor MG2 as described later and is set to 0 as an initial value. At step S310 in a first cycle of this routine, the flag F is set equal to 0.

Upon identification that the flag is set equal to 0, the CPU 72 inputs the current rotational position θm2 of the rotor in the motor MG2 (step S320) and compares the difference between the current rotational position θm2 and the initial rotational position θmi with a reference rotation amount dθref of the motor MG2, which is required for a changeover of the current crowding phase of the motor MG2 to another phase (step S330). This comparison determines whether the rotor of the motor MG2 has been rotated to a certain degree that causes a changeover of the current crowding phase of the motor MG2 from the phase with the concentric current at the start of this routine to another phase.

When the difference between the current rotational position θm2 and the initial rotational position θmi is less than the reference rotation amount dθref, that is, when the current crowding phase of the motor MG2 has not yet changed over from the phase with the concentric current at the start of this routine to another phase, torque decrease control is performed to decrease the output torque of the motor MG2. In the torque decrease control, the CPU 72 starts, if not yet started, counting a torque decrease time td, which represents an elapse of time since a start of the torque decrease control (step S340) and compares the torque decrease time td with a preset reference time tref2 (step S350). The reference time tref2 is set as a time period of sufficiently restricting heat generation in the motor MG2 and in the inverter 41 by decreasing the output torque of the motor MG2 by a predetermined torque decrease rate Rd1 as described later.

When the torque decrease time td is not longer than the preset reference time tref2 (step S350), the result of subtraction of the product of the torque decrease rate Rd1 and the torque decrease time td from the corresponding torque Tmr is set to the torque command Tm2* of the motor MG2 (step S360). This aims to decrease the output torque of the motor MG2 by the torque decrease rate Rd1 (for example, 0.4) for promptly restricting heat generation in the motor MG2 and in the inverter 41 with elapse of the torque decrease time td. The set torque command Tm2* is then sent to the motor ECU 40 (step S390).

After sending the torque command Tm2*, the CPU 72 inputs the current accelerator opening Acc (step S400) and compares the absolute value of the difference between the input current accelerator opening Acc and the initial accelerator opening Acci set at step S300 with a reference value dAref (step S410). The reference value dAref represents a variation in accelerator opening Acc that expects a change of the driver's driving demand. When the absolute value of the difference between the current accelerator opening Acc and the initial accelerator opening Acci is not greater than the reference value dAref, it is expected that there is no substantial change of the driver's driving demand. The torque decrease increase control routine then goes back to step S310. The processing of steps S310 to S360 and steps S390 to S410 is repeated until the difference between the current rotational position θm2 and the initial rotational position θmi becomes not less than the reference rotation amount dAref (step S330) or until the torque decrease time td becomes longer than the preset reference time tref2 (step S350). The motor MG2 is accordingly driven to decrease the output torque of the motor MG2 from the corresponding torque Tmr by the torque decrease rate Rd1. Such drive control of the motor MG2 desirably restricts heat generation in the motor MG2 and in the inverter 41 and thereby prevents a heat-induced damage of the motor MG2 and of the inverter 41. Decreasing the output torque of the motor MG2 from the corresponding torque Tmr moves the vehicle back and rotates the rotor of the motor MG2 linked with the ring gear shaft 32a or the driveshaft.

When the torque decrease time td becomes longer than the preset reference time tref2 (step S350), the CPU 72 sets a torque decrease rate Rd2, which is applied to decrease the output torque of the motor MG2 (step S370). The torque command Tm2* of the motor MG2 is then set according to Equation (1) given below to decrease from the motor torque command Tm2* at the torque decrease time td equal to the preset reference time tref2 by the torque decrease rate Rd2 (step S380):

$$Tm2^* = Tmr - Rd1 \cdot trefd - Rd2 \cdot (td - tred) \quad (1)$$

Figure 5:
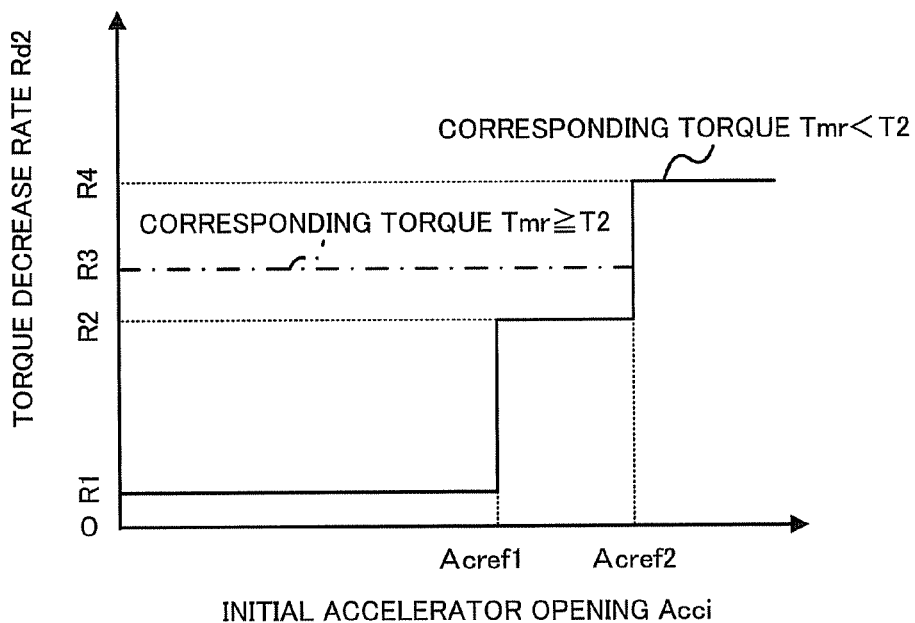
FIG. 5 shows an example of a torque decrease rate setting map.

A concrete procedure of setting the torque decrease rate Rd2 in the first embodiment provides and stores in advance a variation in torque decrease rate Rd2 against the corresponding torque Tmr and the initial accelerator opening Acci as a torque decrease rate setting map in the ROM 74 and reads the torque decrease rate Rd2 corresponding to the given corresponding torque Tmr and the given initial accelerator opening Acci from the stored map. One example of the torque decrease rate setting map is shown in FIG. 5. A solid line plot represents a variation in torque decrease rate Rd2 on condition that the corresponding torque Tmr is lower than a reference value T2, which is determined according to the vehicle weight and other relevant factors. A one-dot chain line plot represents a variation in torque decrease rate Rd2 on condition that the corresponding torque Tmr is not lower than the reference value T2. The reference value T2 is greater than the reference value T1 used for the comparison at step S140 in the drive control routine of FIG. 2. In the state that the corresponding torque Tmr is lower than the reference value T2, the torque decrease rate Rd2 is set to a relatively small value R1 (for example, 0.04) at the initial accelerator opening Acci of not greater than a reference value Acref1, is set to a greater value R2 (for example, 0.2) than the value R1 at the initial accelerator opening Acci between the reference value Acref1 and a reference value Acref2, and is set to a further greater value R4 (for example, 0.3) than the value R2 at the initial accelerator opening Acci of not less than the reference value Acref2. At the initial accelerator opening Acci of not greater than the reference value Acref1, the driver has a relatively small driving demand. In this state, setting the relatively small value R1 to the torque decrease rate Rd2 enables the output torque of the motor MG2 to be decreased with preference given to the ride quality. At the initial accelerator opening Acci of greater than the reference value Acref1, on the other hand, the driver has a relatively large driving demand. In this state, setting the greater value to the torque decrease rate Rd2 gives preference to immediate elimination of the current crowding state over the ride quality. In the state that the corresponding torque Tmr is not lower than the reference value T2, the torque decrease rate Rd2 is set to a value R3 (for example, 0.25) that is greater than the value R2 but is smaller than the value R4 at the initial accelerator opening Acci of not greater than the reference value Acref2 and is set to the value R4 at the initial accelerator opening Acci of greater than the reference value Acref2. Namely the torque decrease rate Rd2 is set to have an increasing tendency with an increase in corresponding torque Tmr. The greater corresponding torque Tmr increases the amount of electric current flowing through the motor MG2. Such setting thus aims to effectively control heat generation in the motor MG2.

The set motor torque command Tm2* is then sent to the motor ECU 40 (step S390). When the absolute value of the difference between the current accelerator opening Acc and the initial accelerator opening Acci is not greater than the reference value dAref (step S410), the torque decrease increase control routine goes back to step S310. The processing of steps S310 to S350 and steps S370 to S410 is repeated until the difference between the current rotational position θm2 and the initial rotational position θmi becomes not less than the reference rotation amount dθref (step S330). The motor MG2 is accordingly controlled to decrease the output torque of the motor MG2 by the torque decrease rate Rd2. This further moves the vehicle back and rotates the rotor of the motor MG2 linked with the ring gear shaft 32a or the driveshaft. The greater initial accelerator opening Acci ensures the more quick achievement of the back motion of the vehicle.

When the difference between the current rotational position θm2 and the initial rotational position θmi is not less than the reference rotation amount dθref (step S330), the back motion of the vehicle with rotation of the rotor in the motor MG2 leads to a changeover of the current crowding phase to another phase among the respective coil phases of the motor MG2. There is accordingly no requirement for a further back motion of the vehicle. In this state, the processing of and after step S420 is performed as torque increase control of increasing the output torque of the motor MG2. Under the condition of the greater initial accelerator opening Acci and of the higher corresponding torque Tmr, the control is performed to decrease the output torque of the motor MG2 more rapidly. This leads to a quick changeover of the current crowding phase to another phase among the respective coil phases of the motor MG2 and immediately restricts heat generation in the motor MG2, while ensuring a quick switchover from the torque decrease control of the motor MG2 to torque increase control. Under the condition of the smaller initial accelerator opening Acci, the control is performed to gently decrease the output torque of the motor MG2. This improves the ride quality.

In the torque increase control of increasing the output torque of the motor MG2, the CPU 72 first starts counting a torque increase time ti, which represents an elapse of time since a start of the torque increase control (step S420). The CPU 72 subsequently sets the current setting of the torque command Tm2* to an initial torque Tmi (step S430) and sets the value 1 to the flag F, which represents execution of the torque increase control (step S440).

Figure 6:
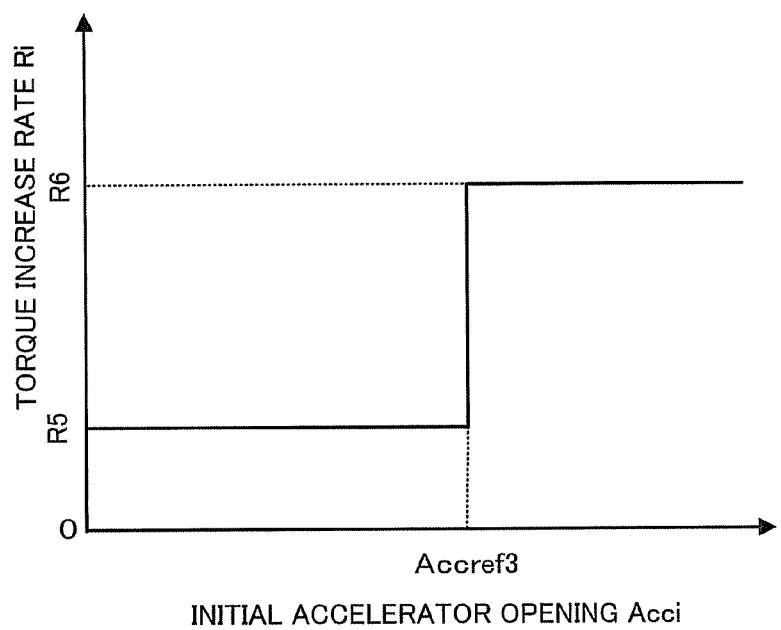
FIG. 6 shows an example of a torque increase rate setting map.

The CPU 72 then sets a torque increase rate Ri, which is applied to increase the output torque of the motor MG2 (step S450). A concrete procedure of setting the torque increase rate Ri in the first embodiment provides and stores in advance a variation in torque increase rate Ri against the initial accelerator opening Acci as a torque increase rate setting map in the ROM 74 and reads the torque increase rate Ri corresponding to the given initial accelerator opening Acci from the stored map. One example of the torque increase rate setting map is shown in FIG. 6. The torque increase rate Ri is set to a relatively small value R5 (for example, 0.1) at the initial accelerator opening Acci of less than a reference value Acref3 and is set to a relatively large value R6 (for example, 1.6) at the initial accelerator opening Acci of not less than the reference value Acref3. At the initial accelerator opening Acci of less than the reference value Accref3, the driver has a relatively small driving demand. In this state, setting the relatively small value R5 to the torque increase rate Ri enables the output torque of the motor MG2 to be increased with preference given to the ride quality. At the initial accelerator opening Acci of not less than the reference value Accref3, on the other hand, the driver has a relatively large driving demand and is expected to further depress the accelerator pedal 83. In this state, setting the relatively large value R6 to the torque increase rate Ri promptly increases the output torque of the motor MG2 and ensures a quick response to the driver's driving demand.

After the torque increase rate Ri is set in the above manner, the sum of the initial torque Tmi and the product of the torque increase rate Ri and the torque increase time ti is set to the torque command Tm2* of the motor MG2 (step S460). This aims to increase the output torque of the motor MG2 by the torque increase rate Ri with elapse of the torque increase time ti. The set motor torque command Tm2* is then compared with the corresponding torque Tmr (step S480). When the set motor torque command Tm2* does not exceed the corresponding torque Tmr, the motor torque command Tm2* is sent to the motor ECU 40 (step S390). When the absolute value of the difference between the current accelerator opening Acc and the initial accelerator opening Acci is not greater than the reference value dAref (steps S400 and S410), the torque decrease increase control routine goes back to step S310 to identify whether the flag F is set equal to 0. The flag F is set equal to 1 at step S440 in the previous cycle, so that the processing of and after step S450 is executed upon identification at step S310. The processing of step S310, steps S450 to S470, and steps S390 to S410 is repeated until the set motor torque command Tm2* exceeds the corresponding torque Tmr (step S470). This increases the output torque of the motor MG2 and restricts the back motion of the vehicle. When the set motor torque command Tm2* exceeds the corresponding torque Tmr (step S470), the CPU 72 resets the flag F to 0 (step S480) and terminates the torque decrease increase control routine. Increasing the output torque of the motor MG2 in the above mariner eventually stops the vehicle and ensures a quick response to the driver's subsequent depression of the accelerator pedal 83.

During the control of decreasing or increasing the output torque of the motor MG2, when the absolute value of the difference between the current accelerator opening Acc and the initial accelerator opening Acci becomes greater than the reference value dAref (steps S400 and S410), it is expected that there is a substantial change of the driver's driving demand. The CPU 72 accordingly resets the flag F to 0 (step S480) and terminates the torque decrease increase control routine.

Figure 7:
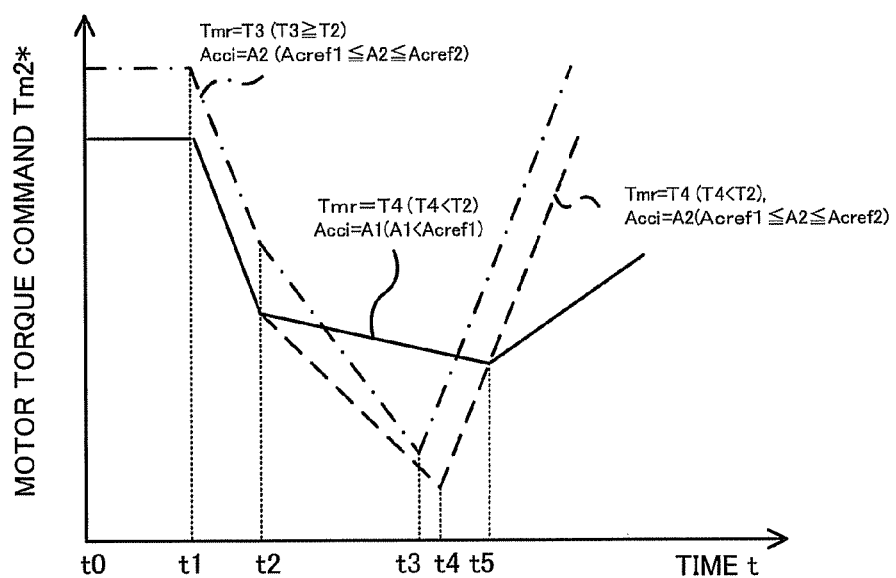
FIG. 7 shows an example of time change of the torque command Tm2*.

The time change of the torque command Tm2* of the motor MG2 and the vehicle behavior are described below. FIG. 7 shows one example of the time change of the torque command Tm2* of the motor MG2. At a time t0, the vehicle stops on an upslope with fixation of the accelerator opening Acc. On condition that the corresponding torque Tmr is equal to a value T3 that is smaller than the reference value T2 and that the initial accelerator opening Acci (accelerator opening Acc in the vehicle stop state) is equal to a value A1 that is less than the reference value Acref1, the motor torque command Tm2* is set to decrease by the torque decrease rate Rd1 for restricting heat generation in the motor MG2 and in the inverter 41 after a time t1 elapsed from the time t0 by the reference time tref1, as shown by a solid line plot in FIG. 7. This controls heat generation in the motor MG2 and in the inverter 41 and moves the vehicle back. After a time t2 elapsed from the time t1 by the reference time tref2, the motor torque command Tm2* is set to decrease by the relatively small torque decrease rate Rd2. This further moves the vehicle back and rotates the rotor of the motor MG2. The motor torque command Tm2* is set to increase by the relatively small torque increase rate Ri after a time t3 when the rotation amount of the rotor in the motor MG2 reaches the reference rotation amount required for a changeover of the current crowding phase. Increasing the motor torque command Tm2* in this manner restricts the back motion of the vehicle. The vehicle stops when the motor torque command Tm2* becomes equal to the corresponding torque Tmr. Setting the relatively small values to the torque decrease rate Rd2 and the torque increase rate Ri desirably controls abrupt torque decrease and increase and thus improves the ride quality. On condition that the corresponding torque Tmr is equal to the value T4 that is smaller than the reference value T2 and that the initial accelerator opening Acci is equal to a value A2 that is not less than the reference value Acref1 but is not greater than the reference value Acref2, the motor torque command Tm2* is set to decrease by the relatively large torque decrease rate Rd2 after the time t2 as shown by a broken line plot. This moles the vehicle back immediately and ensures a quick changeover of the current crowding phase of the motor MG2. After a time t4 when the rotation amount of the rotor in the motor MG2 reaches the reference rotation amount required for a changeover of the current crowding phase, the motor torque command Tm2* is set to increase by the relatively large torque increase rate Ri. This immediately stops the vehicle and ensures a quicker response to the driver's driving demand by the driver's subsequent depression of the accelerator pedal. On condition that the corresponding torque Tmr is equal to a value T3 that is not smaller than the reference value T2 and that the initial accelerator opening Acci is equal to the value A2, the motor torque command Tm2* is set to decrease by the torque decrease rate Rd1 for restricting heat generation in the motor MG2 and in the inverter 41 for a time period between the time t1 and the time t2 as shown by a one-dot chain line plot. For a subsequent time period between the time t2 and the time t3, the motor torque command Tm2* is set to decrease by the greater torque decrease rate Rd2 than the torque decrease rate Rd2 for the motor torque command Tm2* on condition that the corresponding torque Tmr is equal to the value T4 shown by the broken line plot. The greater corresponding torque Tmr leads to the greater amount of heat generation in the motor MG2. Setting the larger value to the torque decrease rate Rd2 ensures quick control of heat generation in the motor MG2 and in the inverter 41.

As described above, on condition that the corresponding torque Tmr as the torque based on the accelerator opening Acc in the vehicle stop state becomes higher than the reference value T1 and that the time duration tmr of the state having the corresponding torque Tmr of higher than the preset reference value T1 becomes longer than the reference time tref1, the hybrid vehicle 20 of the first embodiment decrease the output torque of the motor MG2 by the torque decrease rate Rd2, which is set based on t the corresponding torque Tmr and the accelerator opening Acc in the vehicle stop state (initial accelerator opening Acci). This moves the vehicle back and ensures a changeover of the current crowding phase of the motor MG2. This effectively controls heat generation in the motor MG2 and in the inverter 41. The torque decrease rate Rd2 is set based on the corresponding torque Tmr and the accelerator opening Acc in the vehicle stop state (initial accelerator opening Acci). This arrangement ensures the torque decrease control with reflection of the driver's driving demand. After the back motion of the vehicle, the torque increase rate Ri is set to increase the output torque of the motor MG2 up to the corresponding torque Tmr. The torque increase rate Ri is set based on the accelerator opening Acc in the vehicle stop state (initial accelerator opening Acci). This arrangement ensures the torque increase control with reflection of the driver's driving demand. At the smaller accelerator opening Acc in the vehicle stop state, setting the smaller values to the torque decrease rate Rd2 and to the toque increase rate Ri moves the vehicle back slowly and stops the vehicle gently, thus improving the ride quality.

In the hybrid vehicle 20 of the first embodiment, the torque decrease rate Rd2 and the torque increase rate Ri are increased stepwise with an increase in initial accelerator opening Acci according to the torque decrease increase control routine of FIG. 4. As long as the torque decrease rate Rd2 and the torque increase rate Ri have increasing tendencies with an increase in initial accelerator opening Acci, the torque decrease rate Rd2 and the torque increase rate Ri may be set to increase linearly or non-linearly against the initial accelerator opening Acci. The torque decrease rate Rd2 on condition that the corresponding torque Tmr is not lower than the reference value T2 is set to be greater than the torque decrease rate Rd2 on condition that the corresponding torque Tmr is lower than the reference value T2. As long as the torque decrease rate Rd2 has an increasing tendency with an increase in corresponding torque Tmr, the torque decrease rate Rd2 may be set to increase linearly or non-linearly against the corresponding torque Tmr.

In the hybrid vehicle 20 of the first embodiment, according to the torque decrease increase control routine of FIG. 4, the motor MG2 is driven to decrease the output torque of the motor MG2 by the torque decrease rate Rd1 for quickly restricting heat generation in the motor MG2 and in the inverter 41 until the torque decrease time td exceeds the reference time tref2 and to subsequently decrease the output torque of the motor MG2 by the torque decrease rate Rd2 set based on the initial accelerator opening Acci and the corresponding torque Tmr. One modification of the torque decrease increase control may drive the motor MG2 to immediately decrease the output torque of the motor MG2 by the torque decrease rate Rd2 without the torque decrease by the torque decrease rate Rd1.

In the hybrid vehicle 20 of the first embodiment, during execution of the drive control routine of FIG. 2, on condition that the corresponding torque Tmr becomes higher than the reference value T1 in the vehicle stop state and that the time duration tmr of the state having the corresponding torque Tmr of higher than the reference value T1 becomes longer than the reference time tref1, the torque decrease increase control routine of FIG. 4 starts to decrease or increase the output torque of the motor MG2. The torque decrease increase control routine of FIG. 4 may start immediately when the corresponding torque Tmr exceeds the reference value T1 in the vehicle stop state.

Figure 8:
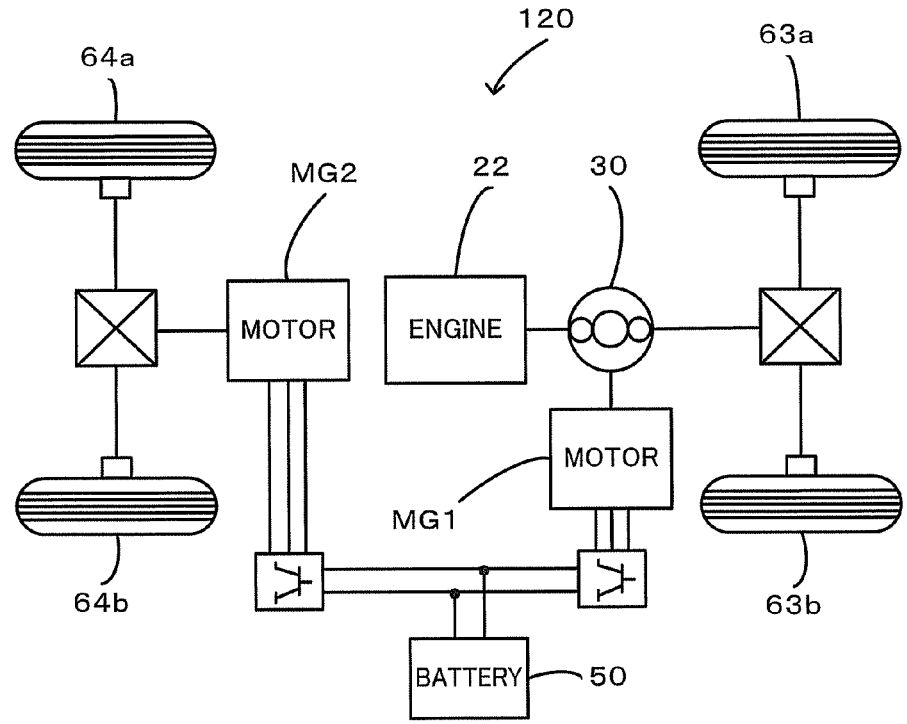
FIG. 8 schematically illustrates the configuration of a hybrid vehicle 120 of one modified structure.

In the hybrid vehicle 20 of the first embodiment, the power of the motor MG2 is subjected to speed change by the reduction gear 35 and is output to the ring gear shaft 32a. The technique of the invention is also applicable to a hybrid vehicle 120 of a modified structure shown in FIG. 8. In the hybrid vehicle 120 of FIG. 8, the power of the motor MG2 is connected to another axle (an axle linked with wheels 64a and 64b) that is different from the axle connecting with the ring gear shaft 32a (the axle linked with the drive wheels 63a and 63b).

Figure 9:
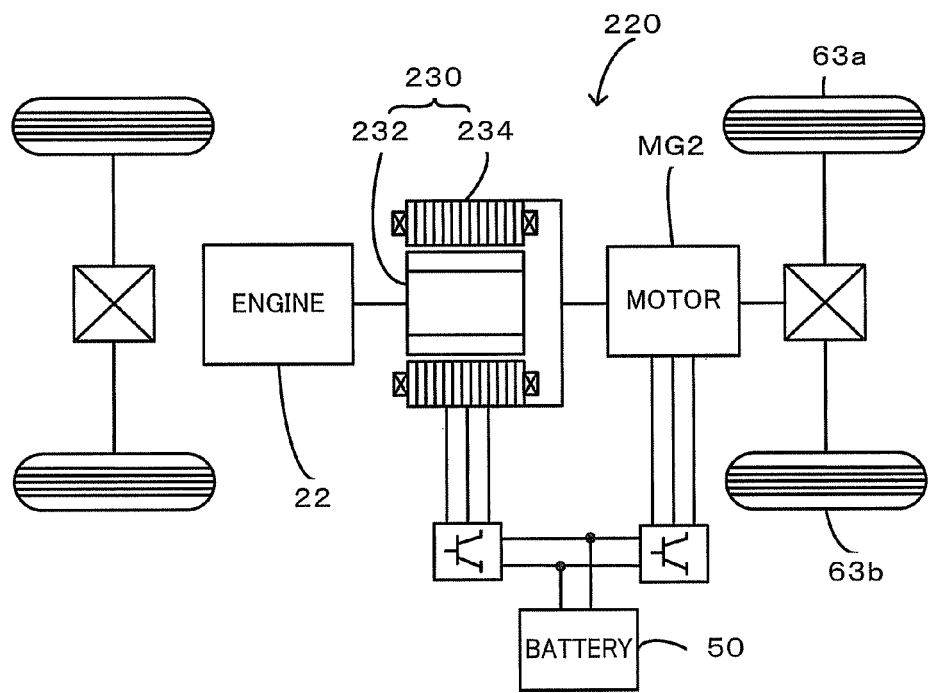
FIG. 9 schematically illustrates the configuration of a hybrid vehicle 220 of another modified structure.

In the hybrid vehicle 20 of the first embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 9. The hybrid vehicle 220 of FIG. 9 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The first embodiment describes application of the invention to the hybrid vehicle driven with the powers of the engine 22 and the motor MG2 output to the axle. The technique of the invention is also applicable to a vehicle of any configuration equipped with a motor arranged to output power to an axle, for example, an electric vehicle driven with only the power of a motor output to an axle. Another application of the invention is a control method of such a vehicle.

The primary elements in the structure of the first embodiment are mapped to the primary constituents in the configuration of the invention (primary constituents of the first vehicle) described in the section 'Disclosure of the Invention'. The motor MG2 arranged to output power to the axle linked with the drive wheels 63a and 63b in the structure of the first embodiment corresponds to the 'motor' in the configuration of the invention. The accelerator pedal position sensor 84 arranged to detect the driver's depression amount of the accelerator pedal 83 in the structure of the first embodiment corresponds to the 'accelerator operation amount detector' in the configuration of the invention. The hybrid electronic control unit 70 executing the processing of step S370 in the torque decrease increase control routine of FIG. 4 in the first embodiment is equivalent to the 'decrease rate setting module' of the invention. The processing of step S370 sets the torque decrease rate Rd2 to be adopted for decreasing the output torque of the motor MG2, based on the corresponding torque Tmr and the accelerator opening Acc input from the accelerator pedal position sensor 84 (initial accelerator opening Acci). The hybrid electronic control unit 70 executing the processing of step S450 in the torque decrease increase control routine of FIG. 4 in the first embodiment is equivalent to the 'increase rate setting module' of the invention. The processing of step S450 sets the torque increase rate Rdi to be adopted for decreasing the output torque of the motor MG2, based on the accelerator opening Acc input from the accelerator pedal position sensor 84 (initial accelerator opening Acci). The hybrid electronic control unit 70 executing the processing of step S380 or the processing of step S460 in the torque decrease increase control routine of FIG. 4 in the first embodiment is equivalent to the 'controller' of the invention. Step S380 is activated on condition that the time duration tmr of the state having the corresponding torque Tmr of higher than the reference value T1 becomes longer than the reference time tref1 and that the absolute value of the difference between the current accelerator opening Acc and the initial accelerator opening Acci is not greater than the reference value dAref, in the vehicle stop state with output of the corresponding torque Tmr from the motor MG2 based on the accelerator opening Acc. The processing of step S380 sets the motor torque command Tm2* to decrease the output torque of the motor MG2 by the torque decrease rate Rd2 until the difference between the current rotational position θm2 and the initial rotational position θmi reaches or exceeds the reference rotation amount dθref. Step S460 is activated on condition that the difference between the current rotational position θm2 and the initial rotational position θmi reaches or exceeds the reference rotation amount dθref. The processing of step S460 sets the motor torque command Tm2* to increase the output torque of the motor MG2 by the torque increase rate Ri until the motor torque command Tm2* exceeds the corresponding torque Tmr. The above mapping of the primary elements in the structure of the first embodiment to the primary constituents in the configuration of the invention does not restrict the constituents of the invention described in the section 'Disclosure of the Invention' in any sense but is only illustrative, since the first embodiment is only one concrete mode of carrying out the invention described in the section 'Disclosure of the Invention'. Namely the invention described in the section 'Disclosure of the Invention' is to be interpreted, based on the description of the section, and the first embodiment is to be considered in all aspects as illustrative and not restrictive.

Figure 10:
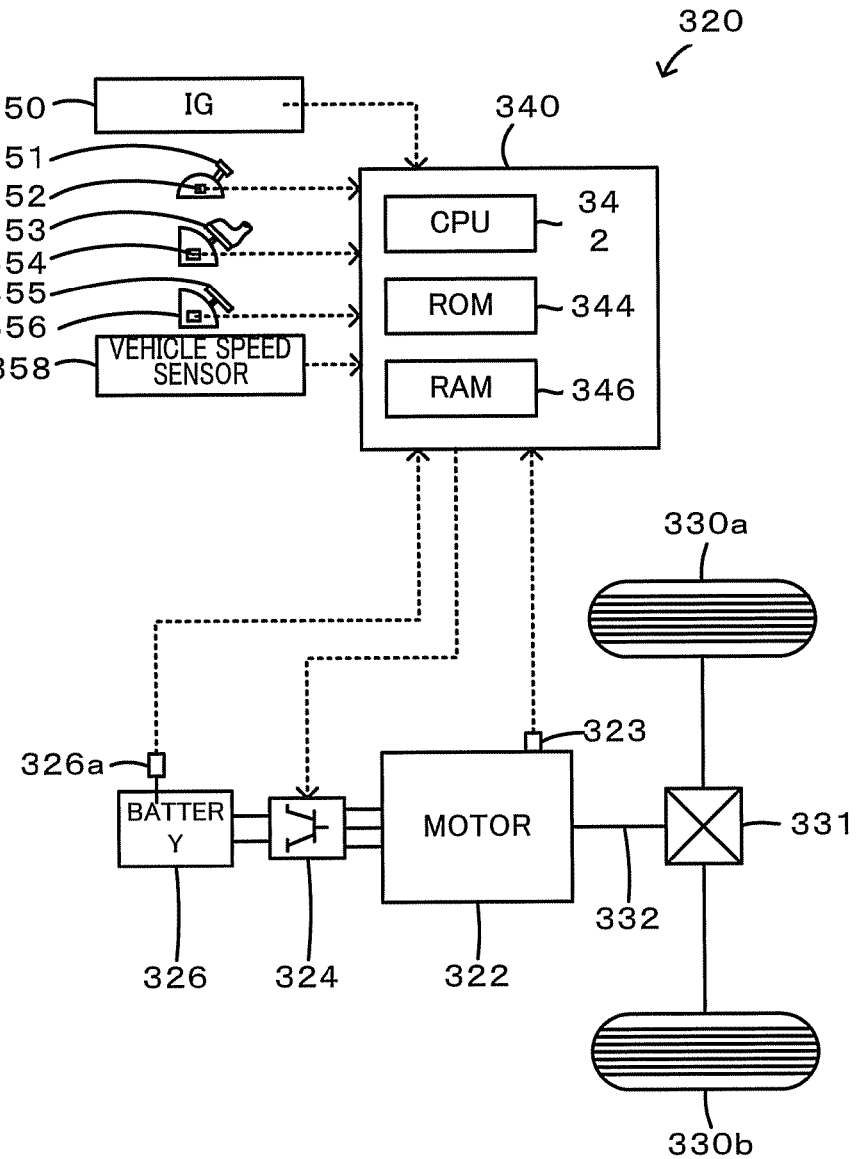
FIG. 10 schematically illustrates the configuration of an electric vehicle 320 in a second embodiment of the invention.

An electric vehicle 320 is described below as a second embodiment of the invention. FIG. 10 schematically illustrates the configuration of the electric vehicle 320 in the second embodiment of the invention. As illustrated, the electric vehicle 320 of the second embodiment includes a motor 322 arranged to input and output power from and to a driveshaft 332 linked with drive wheels 330a and 330b via a differential gear 331, a battery 326 arranged to transmit electric power to and from the motor 322 via an inverter 324 for driving the motor 322, an electronic control unit 340 configured to control the operations of the whole electric vehicle 320, and a navigation system 60 configured to make communication with the electronic control unit 340.

The motor 322 is constructed as a PM-type synchronous generator motor having a rotor with permanent magnets attached to an outer circumferential face thereof and a stator with three phase coils wound thereon. The inverter 324 includes six switching elements and converts dc power supplied from the battery 326 into quasi three-phase ac power to supply the converted quasi three-phase ac power to the motor 322.

The electronic control unit 340 is constructed as a microprocessor including a CPU 342, a ROM 344 configured to store processing programs, a RAM 346 configured to temporarily store data, input and output ports (not shown), and a communication port (not shown) The electronic control unit 340 inputs, via its input port, a motor rotational position θm or the rotational position of the rotor in the motor 322 from a rotational position detection sensor 323, a battery temperature tb of the battery 326 from a temperature sensor 26a, an ignition signal from an ignition switch 350, a gearshift position SP or a current setting position of a gearshift lever 351 from a gearshift position sensor 352, an accelerator opening Acc or the driver's depression amount of an accelerator pedal 353 from an accelerator pedal position sensor 354, a brake pedal position BP or the driver's depression amount of a brake pedal 355 from a brake pedal position sensor 356, and a vehicle speed V from a vehicle speed sensor 358. The electronic control unit 340 outputs, via its output port, switching control signals to the switching elements included in the inverter 324 to drive and control the motor 322.

Figure 11:
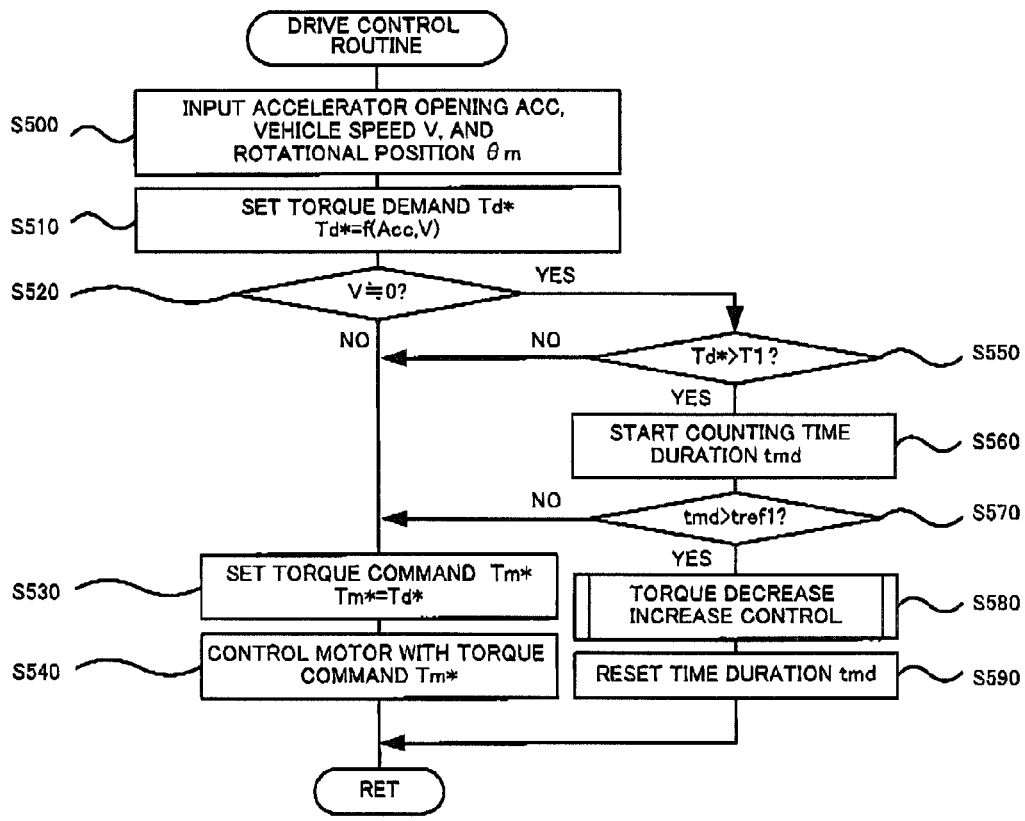
FIG. 11 is a flowchart showing a drive control routine executed by an electronic control unit 340 in the second embodiment.

The following describes the operations of the electric vehicle 320 of the second embodiment having the configuration discussed above. FIG. 11 is a flowchart showing a drive control routine executed by the electronic control unit 340.

Figure 12:
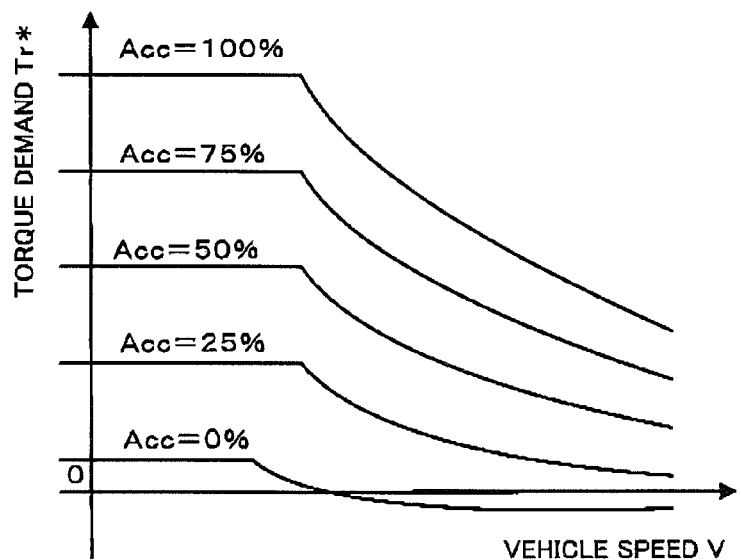
FIG. 12 shows an example of a torque demand setting map.

In the drive control routine, the CPU 342 of the electronic control unit 340 first inputs various data required for control, for example, the accelerator opening Acc from the accelerator pedal position sensor 354, the vehicle speed V from the vehicle speed sensor 358, and the motor rotational position θm from the rotational position detection sensor 323 (step S500). The CPU 342 subsequently sets a torque demand Td* to be output to the driveshaft 332, based on the input accelerator opening Acc and the input vehicle speed V (step S510). A concrete procedure of setting the torque demand Td* in the second embodiment provides and stores in advance variations in torque demand Td* against the vehicle speed V with regard to various settings of the accelerator opening Acc as a torque demand setting map in the ROM 344 and reads the torque demand Td* corresponding to the given accelerator opening Acc and the given vehicle speed V from this torque demand setting map. One example of the torque demand setting map is shown in FIG. 12.

The CPU 342 then identifies whether the vehicle has a substantially stop by referring to the input vehicle speed V (step S520). A concrete procedure of identifying a substantial stop or no substantial stop of the vehicle determines whether the absolute value of the vehicle speed V is not higher than a specific vehicle speed (for example, 2 km/hour) suggesting a substantial stop of the vehicle. In the state of the vehicle having a substantial stop, the vehicle is in a current crowding state with concentric flow of electric current in a specific phase among the respective coil phases of the motor 322. This may cause a significant temperature rise in the motor 322 or in the inverter 324. Upon identification of no substantial stop of the vehicle, it is determined that the vehicle is not in the current crowding state. The CPU 342 accordingly sets the torque demand Td* to a torque command Tm* of the motor 322 (step S530) and performs switching control of the switching elements included in the inverter 324 to drive the motor 322 with the set torque command Tm* (step S540). The drive control routine is then terminated. In the state of the vehicle having no substantial stop, the motor 322 is controlled to output a torque equivalent to the torque demand Td*, which is to be output to the driveshaft 332.

Upon identification of a substantial stop of the vehicle (step S520), on the other hand, the torque demand Td* is compared with a preset reference value T1 as an upper limit torque in an acceptable range of heat generation in the motor 322 and in the inverter 324 (step S550). When the torque demand Td* is not higher than the reference value T1, the output of a torque equivalent to the torque demand Td* from the motor 322 does not cause a significant temperature rise in the inverter 324 or in the motor 322, because of the low current flow through the respective coil phases of the motor 322. The drive control routine is accordingly terminated after the processing of steps S530 and S540. On condition that the torque demand Td* is not higher than the preset reference value T1 in the vehicle stop state, the motor 322 is controlled to output a power equivalent to the torque demand Td*.

When the torque demand Td* is higher than the preset reference value T1 (step S550), on the other hand, the CPU 342 starts, if not yet started, counting a time duration tmd, which represents continuance of the state having the torque demand Td* of higher than the reference value T1 (step S560). The time duration tmd is then compared with a preset reference time tref1 as an upper limit duration of output of the torque demand Td* from the motor 322 in an acceptable range of heat generation in the motor 322 and in the inverter 324 (step S570). When the time duration tmd is not longer than the preset reference time tref1, it is determined that the continuous output of the torque equivalent to the torque demand Td* from the motor 322 does not cause a heat-induced damage of the motor 322 or of the inverter 324. The drive control routine is accordingly terminated after the processing of steps S530 and S540. On condition that the time duration tmd of the state having the torque demand Td* of higher than the reference value T1 is not longer than the preset reference time tref1, the motor 322 is controlled to output a torque equivalent to the torque demand Td*.

When the time duration tmd is longer than the preset reference time tref1 (step S570), on the other hand, it is determined that the continuous output of the torque equivalent to the torque demand Td* from the motor 322 may cause a heat-induced damage of the motor 322 or of the inverter 324. The drive control routine then executes torque decrease increase control (step S580) as described below in detail with reference to the flowchart of FIG. 13, resets the time duration tmd (step S590), and is terminated.

Figure 13:
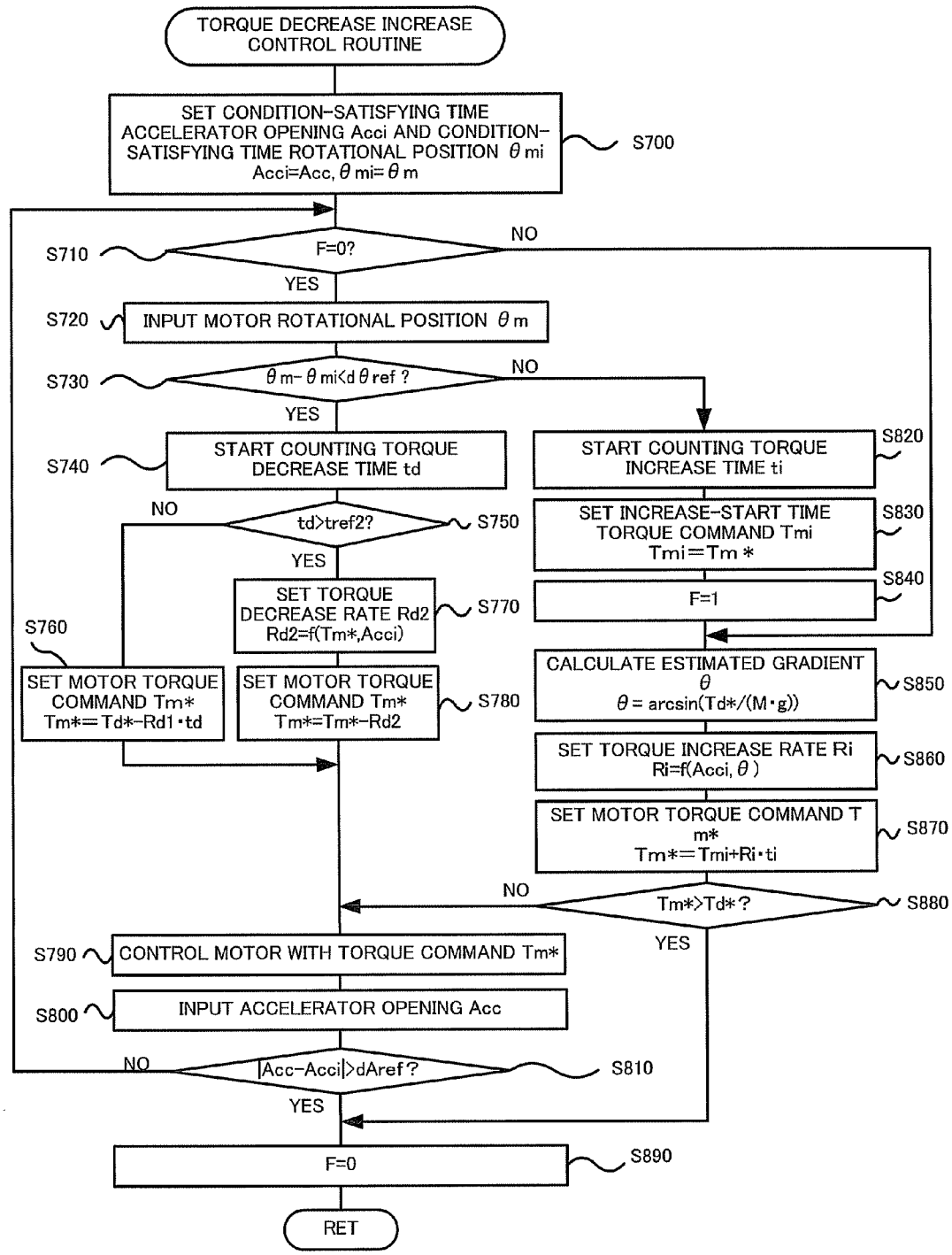
FIG. 13 is a flowchart showing the details of a torque decrease increase control executed by the electronic control unit 340 in the second embodiment.

The torque decrease increase control performed at step S580 is explained in detail. FIG. 13 is a flowchart showing the details of the torque decrease increase control. In the torque decrease increase control routine, the CPU 342 first sets the accelerator opening Acc and the rotational position θm of the rotor in the motor 322 input at step S500 in the drive control routine of FIG. 11 to a condition-satisfying time accelerator opening Acci and a condition-satisfying time rotational position θmi as the accelerator opening and the rotational position of the rotor in the motor 322 upon satisfaction of the conditions for executing the torque decrease increase control, that is, on a start of this routine (step S700). It is then identified whether a flag is set equal to 0 (step S710). The flag is set to 1 during control of increasing the torque output from the motor 322 as described later and is set to 0 as an initial value. At step S710 in a first cycle of this routine, the flag F is set equal to 0.

Upon identification that the flag is set equal to 0, the CPU 342 inputs the current rotational position θm of the rotor in the motor 322 (step S720) and compares the difference between the rotational position θm and the condition-satisfying time rotational position θmi with a reference rotation amount dθref of the motor 322, which is required for a changeover of the current crowding phase of the motor 322 to another phase (step S730). This comparison determines whether the rotor of the motor 322 has been rotated to a certain degree that causes a changeover of the current crowding phase of the motor 322 from the phase with the concentric current at the start of this routine to another phase.

When the difference between the current rotational position θm and the condition-satisfying time rotational position θmi is less than the reference rotation amount dθref, that is, when the current crowding phase of the motor 322 has not yet changed over from the phase with the concentric current at the start of this routine to another phase, torque decrease control is performed to decrease the output torque of the motor 322.

In the torque decrease control, the CPU 342 starts, if not yet started, counting a torque decrease time td, which represents an elapse of time since a start of the torque decrease control (step S740) and compares the torque decrease time td with a preset reference time tref2 (step S750). The reference time tref2 is set as a time period of sufficiently restricting heat generation in the motor 322 and in the inverter 324 by decreasing the output torque of the motor 322 by a predetermined torque decrease rate Rd1 as described later.

When the torque decrease time td is not longer than the preset reference time tref2 (step S750), the result of subtraction of the product of the torque decrease rate Rd1 and the torque decrease time td from the torque demand Td* is set to the torque command Tm* of the motor 322 (step S760). This aims to decrease the output torque of the motor 322 by the torque decrease rate Rd1 (for example, 0.4) for promptly restricting heat generation in the motor 322 and in the inverter 324 with elapse of the torque decrease time td. The motor 322 is then controlled with the set torque command Tm* (step S790). The CPU 342 inputs the current accelerator opening Acc (step S800) and compares the absolute value of the difference between the input current accelerator opening Acc and the condition-satisfying time accelerator opening Acci with a reference value dAref (step S810). The reference value dAref represents a variation in accelerator opening Acc that expects a change of the driver's driving demand. When the absolute value of the difference between the current accelerator opening Acc and the condition-satisfying time accelerator opening Acci is not greater than the reference value dAref, it is expected that there is no substantial change of the driver's driving demand. The torque decrease increase control routine then goes back to step S710. The processing of steps S710 to S760 and steps S790 to S810 is repeated until the difference between the rotational position θm and the condition-satisfying time rotational position θmi becomes not less than the reference rotation amount dθref (step S730) or until the torque decrease time td becomes longer than the preset reference time tref2 (step S750). The motor 322 is accordingly driven to decrease the output torque of the motor 322 from the torque demand Td* by the torque decrease rate Rd1. This gradually decreases the amount of electric current flowing through the motor 322 to restrict heat generation in the motor 322 and in the inverter 324 and thereby prevents a heat-induced damage of the motor 322 and of the inverter 324. Decreasing the output torque of the motor 322 from the torque demand Td* moves the vehicle back and rotates the rotor of the motor 322 linked with the driveshaft 332.

Figure 14:
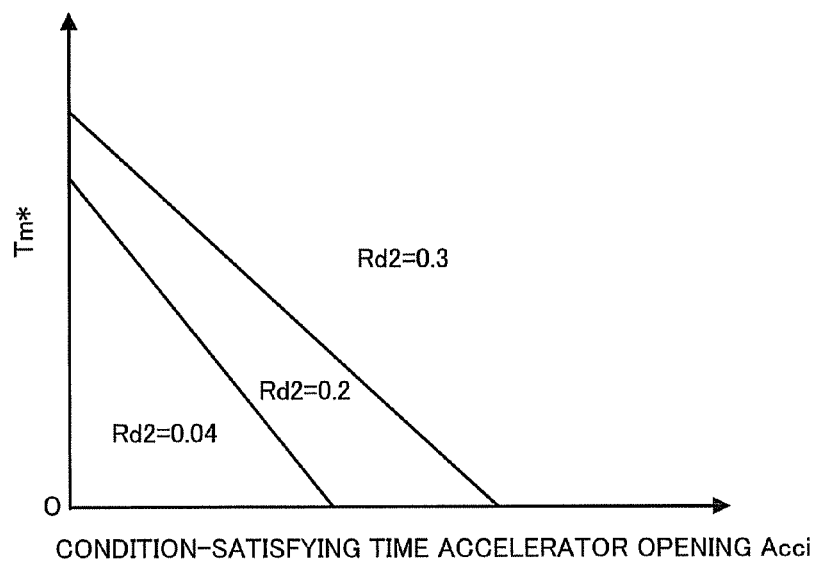
FIG. 14 shows an example of the torque decrease rate setting map.

When the torque decrease time td becomes longer than the preset reference time tref2 (step S750), the CPU 342 sets a torque decrease rate Rd2, which is applied to decrease the output torque of the motor 322 (step S770). The result of subtraction of the torque decrease rate Rd2 from the current setting of the torque command Tm* of the motor 322 is set to the new motor torque command Tm* (step S780). A concrete procedure of setting the torque decrease rate Rd2 in the second embodiment provides and stores in advance a variation in torque decrease rate Rd2 against the current setting of the torque command Tm* of the motor 322 and the condition-satisfying time accelerator opening Acci as a torque decrease rate setting map in the ROM 74 and reads the torque decrease rate Rd2 corresponding to the given current setting of the torque command Tm* of the motor 322 and the given condition-satisfying time accelerator opening Acci from the stored map. One example of the torque decrease rate setting map is shown in FIG. 14. The torque decrease rate Rd2 is set to have an increasing tendency with an increase in accelerator opening in the vehicle stop state (condition-satisfying time accelerator opening Acci) and with an increase in current setting of the torque command Tm* of the motor 322. Increasing the torque decrease rate Rd2 with an increase in accelerator opening in the vehicle stop state (condition-satisfying time accelerator opening Acci) is ascribed to the following reason. The driver's greater driving demand is expected, based on the greater accelerator opening in the vehicle stop state (condition-satisfying time accelerator opening Acci). In response to this large driving demand, the control is performed to quickly decrease the output torque of the motor 322 and thereby move the vehicle back immediately. This gives preference to immediate elimination of the current crowding state over the ride quality. The driver's smaller driving demand is expected, based on the smaller accelerator opening in the vehicle stop state (condition-satisfying time accelerator opening Acci). In response to this small driving demand, the control is performed to gently decrease the output torque of the motor 322 and thereby move the vehicle back slowly. This gives preference to the ride quality over immediate elimination of the current crowding state. Increasing the torque decrease rate Rd2 with an increase in current setting of the torque command Tm* of the motor 322 is ascribed to the following reason. The higher current setting of the torque command Tm* of the motor 322 leads to the greater amount of electric current flowing through the motor 322. Such setting gives preference to control of heat generation in the motor 322 over the ride quality. Decreasing the torque decrease rate Rd2 with a decrease in current setting of the torque command Tm* of the motor 322 is ascribed to the following reason. The lower current setting of the torque command Tm* of the motor 322 leads to the smaller amount of electric current flowing through the motor 322. Such setting moves the vehicle back slowly and thereby gives preference to the ride quality over control of heat generation in the motor 322.

The motor 322 is then controlled with the set torque command Tm* (step S790). When the absolute value of the difference between the input accelerator opening Acc and the condition-satisfying time accelerator opening Acci is not greater than the reference value dAref (steps S800 and S810), the torque decrease increase control routine goes back to step S710. The processing of steps S710 to S750 and steps S770 to S810 is repeated until the difference between the rotational position θm of the rotor in the motor 322 and the condition-satisfying time rotational position θmi becomes not less than the reference rotation amount dθref (step S730). The motor 322 is accordingly controlled to decrease the output torque of the motor 322 by the torque decrease rate Rd2. This further moves the vehicle back and rotates the rotor of the motor 322 linked with the ring gear shaft 32a or the driveshaft. Under the condition of the greater condition-satisfying time accelerator opening Acci and of the higher current setting of the torque command Tm* of the motor 322, the control is performed to quickly decrease the output torque of the motor 322 and thereby move the vehicle back immediately. This leads to a quick changeover of the current crowding phase to another phase among the respective coil phases of the motor 322 and immediately restricts heat generation in the motor 322, while ensuring a quick switchover from the torque decrease control of the motor 322 to torque increase control described below. Under the condition of the smaller condition-satisfying time accelerator opening Acci and of the lower current setting of the torque command Tm* of the motor 322, the control is performed to gently decrease the output torque of the motor 322 and thereby move the vehicle back slowly. This improves the ride quality.

During the torque decrease control of the motor 322, when the difference between the current rotational position θm of the rotor in the motor 322 and the condition-satisfying time rotational position θmi is not less than the reference rotation amount dθref (step S730), the back motion of the vehicle with rotation of the rotor in the motor 322 leads to a changeover of the current crowding phase to another phase among the respective coil phases of the motor 322. There is accordingly no requirement for a further back motion of the vehicle. In this state, the processing of and after step S820 is performed as torque increase control of increasing the output torque of the motor 322.

In the torque increase control, the CPU 342 first starts counting a torque increase time ti, which represents an elapse of time since a start of the torque increase control (step S820). The CPU 342 subsequently sets the current setting of the torque command Tm* to an increase-start time torque command Tmi (step S830) and sets the value 1 to the flag F, which represents execution of the torque increase control of the motor 322 (step S840).

The CPU 342 then calculates an estimated gradient θ or an estimated value of the road surface slope from the torque demand Td* set at step S510 in the drive control routine of FIG. 11 and a vehicle weight M according to Equation (2) given below (step S850) and sets a torque increase rate Ri, which is applied to increase the output torque of the motor 322 (step S860):

$$\theta = \arcsin(Td^*/(M \cdot g)) \quad (2)$$

Figure 15:
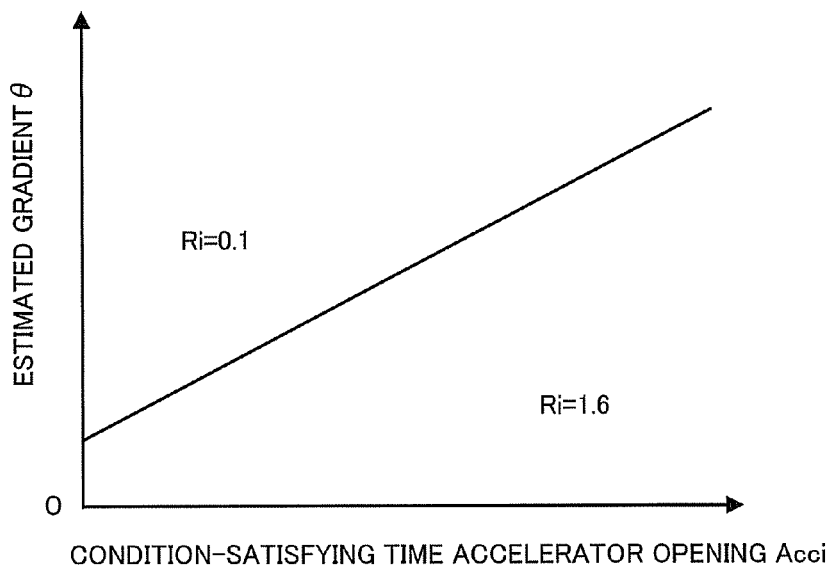
FIG. 15 shows an example of the torque increase rate setting map.

A concrete procedure of setting the torque increase rate Ri in the second embodiment provides and stores in advance a variation in torque increase rate Ri against the estimated gradient θ and the condition-satisfying time accelerator opening Acci as a torque increase rate setting map in the ROM 74 and reads the torque increase rate Ri corresponding to the given estimated gradient θ and the given condition-satisfying time accelerator opening Acci from the stored map. One example of the torque increase rate setting map is shown in FIG. 15. The torque increase rate Ri is set to have an increasing tendency with a decrease in estimated gradient θ and with an increase in accelerator opening Acc in the vehicle stop state (condition-satisfying time accelerator opening Acci). Increasing the torque increase rate Ri with a decrease in estimated gradient θ is ascribed to the following reason. The smaller amount of accelerator operation generally suggests the driver's smaller driving demand. On condition that the vehicle stops on the road surface of a gentle slope, the small amount of accelerator operation may reflect not the driver's vehicle stop request but the driver's driving demand. On condition that the vehicle stops on the road surface of a steep slope, on the other hand, the large amount of accelerator operation may reflect not the driver's driving demand but the driver's vehicle stop request. Under the condition of a constant accelerator operation amount Acci, the driver's greater driving demand is expected, based on the smaller estimated gradient θ. In response to this large driving demand, the control is performed to quickly increase the output torque of the motor 322 by the large torque increase rate Ri and immediately stop the vehicle. This gives preference to the driver's driving demand over the ride quality. The driver's smaller driving demand is expected, based on the greater estimated gradient θ. In response to this small driving demand, the control is performed to gently increase the output torque of the motor 322 by the small torque increase rate Ri and slowly stop the vehicle. This gives preference to the ride quality over the driver's driving demand. Increasing the torque increase rate Ri with an increase in accelerator opening Acc in the vehicle stop state (condition-satisfying time accelerator opening Acci) is ascribed to the following reason. The driver's greater driving demand is expected, based on the greater accelerator opening Acc in the vehicle stop state. In response to this large driving demand, the control is performed to quickly increase the output torque of the motor 322. This gives preference to the driver's driving demand over the ride quality. The driver's smaller driving demand is expected, based on the smaller accelerator opening Acc in the vehicle stop state. In response to this small driving demand, the control is performed to gently increase the output torque of the motor 322. This gives preference to the ride quality over the driver's driving demand.

After the torque increase rate Ri is set in the above manner, the sum of the increase-start time torque command Tmi and the product of the torque increase rate Ri and the torque increase time ti is set to the torque command Tm* of the motor 322 (step S870). This aims to increase the output torque of the motor 322 by the torque increase rate Ri with elapse of the torque increase time ti. The set motor torque command Tm* is then compared with the torque demand Td* (step S880). When the set motor torque command Tm* is not greater than the torque demand Td*, the motor 322 is controlled with the set torque command Tm* (step S790). When the absolute value of the difference between the current accelerator opening Acc and the condition-satisfying time accelerator opening Acci is not greater than the reference value dAref (steps S800 and S810), the torque decrease increase control routine goes back to step S710 to identify whether the flag F is set equal to 0. The flag F is set to 1 during execution of the torque increase control, so that the processing of and after step S850 is executed upon identification at step S710. The processing of step S710, steps S850 to S880, and steps S790 to S810 is repeated until the set motor torque command Tm* exceeds the torque demand Td* (step S880). This increases the output torque of the motor 322 and restricts the back motion of the vehicle. When the set motor torque command Tm* exceeds the torque demand Td* (step S880), the CPU 342 resets the flag F to 0 (step S890) and terminates the torque decrease increase control routine. Increasing the output torque of the motor 322 in the above manner eventually stops the vehicle and ensures a quick response to the driver's subsequent depression of the accelerator pedal 353.

During the control of decreasing or increasing the output torque of the motor 322, when the absolute value of the difference between the current accelerator opening Acc and the condition-satisfying time accelerator opening Acci becomes greater than the reference value dAref (steps S800 and S810), it is expected that there is a substantial change of the driver's driving demand. The CPU 342 accordingly resets the flag F to 0 (step S890) and terminates the torque decrease increase control routine.

As described above, after the back motion of the vehicle, the electric vehicle 320 of the second embodiment increases the output torque of the motor 322 by the torque increase rate Ri, which is set based on the estimated gradient θ and the accelerator opening in the vehicle stop state (condition-satisfying time accelerator opening Acci). This ensures the control reflecting the driver's driving demand. The torque increase rate Ri is set to have an increasing tendency with a decrease in estimated gradient θ and with an increase in accelerator opening in the vehicle stop state. Such setting quickly increases the output torque of the motor in response to the driver's large driving demand. This ensures a quicker response to the driver's subsequent driving demand and enables the motor to output a required torque based on the driver's driving demand.

The electric vehicle 320 of the second embodiment calculates the estimated gradient θ based on the torque demand Td* and the vehicle weight M. Any physical quantity reflecting the slope of the road surface may be used for calculation of the estimated gradient θ. One modified structure may provide a slope sensor for measuring the slope of the road surface. The measurement value directly observed by the slope sensor may be set to the estimated gradient θ.

The electric vehicle 320 of the second embodiment decreases the motor torque command Tm* by the torque decrease rate Rd1 for quickly restricting heat generation in the motor MG2 and in the inverter 41 until the torque decrease time td exceeds the preset reference time tref2 and subsequently decreases the motor torque command Tm* by the torque decrease rate Rd2 set based on the condition-satisfying time accelerator opening Acci and the torque demand Td*. One modification of the torque decrease increase control may drive the motor MG2 to immediately decrease the motor torque command Tm* by the torque decrease rate Rd2 without the torque decrease by the torque decrease rate Rd1.

In the electric vehicle 320 of the second embodiment, during execution of the drive control routine of FIG. 11, on condition that the time duration tmd of the state having the torque demand Td* of higher than the reference value T1 in the vehicle stop state becomes longer than the reference time tref1, the torque decrease increase control routine of FIG. 13 starts to decrease or increase the output torque of the motor MG2. The torque decrease increase control routine of FIG. 13 may start immediately when the torque demand Td* exceeds the reference value T1 in the vehicle stop state.

Figure 16:
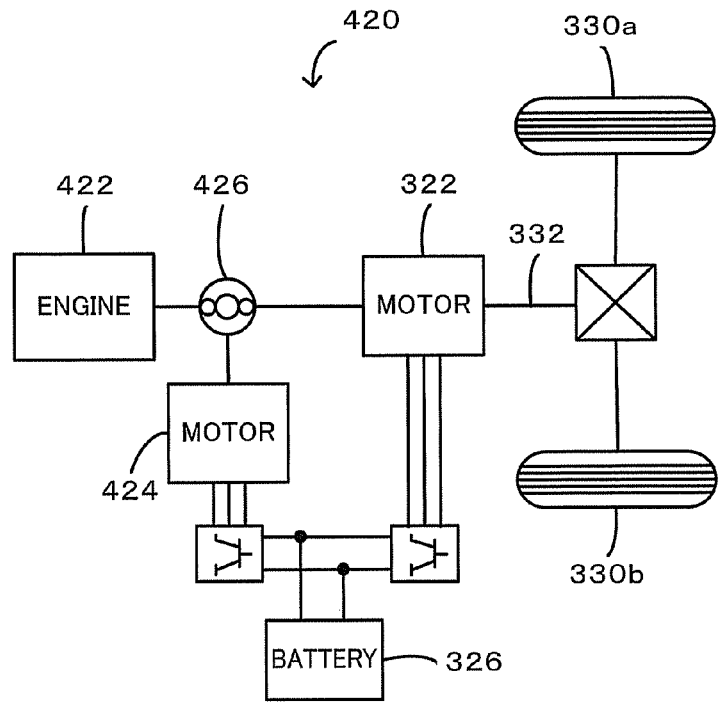
FIG. 16 schematically illustrates the configuration of a hybrid vehicle 420 of one modified structure.
Figure 17:
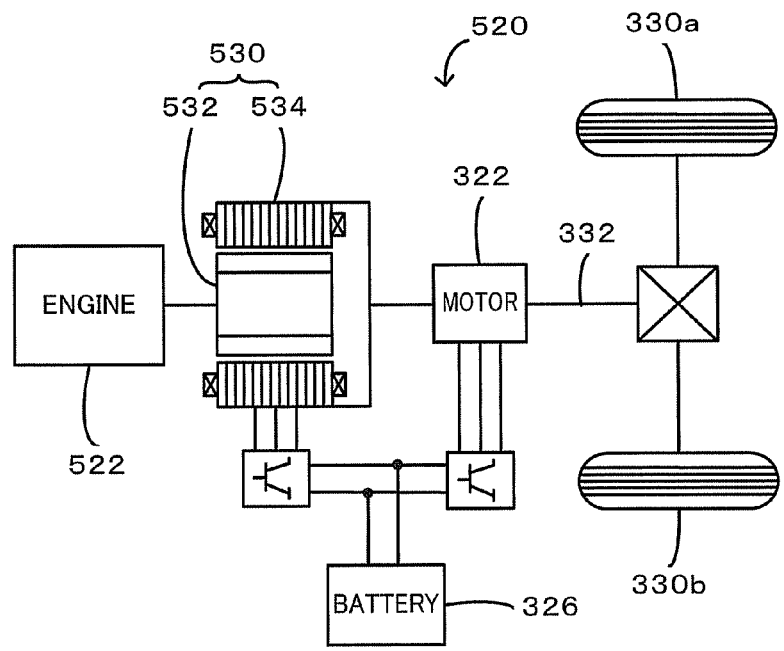
FIG. 17 schematically illustrates the configuration of a hybrid vehicle 520 of another modified structure.

The second embodiment describes application of the invention to the electric vehicle 320 equipped with the motor 322 arranged to input and output power from and to the driveshaft 332 and with the battery 326 arranged to transmit electric power to and from the motor 322. The technique of the invention is also applicable to an electric vehicle 420 of one modified structure shown in FIG. 16. The electric vehicle 420 of FIG. 16 includes an engine 422 and a motor 424 connected to a driveshaft 332 via a planetary gear mechanism 426, in addition to a motor 322 and a battery 326. The technique of the invention is further applicable to an electric vehicle 520 of another modified structure shown in FIG. 17. The electric vehicle 520 of FIG. 17 has an engine 522 and a pair-rotor motor 530. The pair-rotor motor 530 includes an inner rotor 532 connected to a crankshaft of the engine 522 and an outer rotor 534 connected to a driveshaft 332 linked with drive wheels 330a and 330b. The pair-rotor motor 530 transmits part of the output power of the engine 522 to the driveshaft 332, while converting the residual engine output power into electric power. The electric vehicle 320 driven with the power of the motor 322 as the power source is described as the second embodiment of the invention. The technique of the invention is also applicable to an automobile driven with the power of an internal combustion engine as the power source. Another application of the invention is a control method of any of these vehicles.

The primary elements in the structure of the second embodiment are mapped to the primary constituents in the configuration of the invention (primary constituents of the second vehicle) described in the section 'Disclosure of the Invention'. The motor 322 arranged to output power to the axle linked with the driveshaft 332 in the structure of the second embodiment corresponds to the 'motor' in the configuration of the invention. The accelerator pedal position sensor 54 arranged to detect the driver's accelerator operation amount in the structure of the second embodiment corresponds to the 'accelerator operation amount detector' in the configuration of the invention. The electronic control unit 340 executing the processing of step S510 to set the torque demand Td* required for driving based on the accelerator operation amount in the drive control routine of the second embodiment is equivalent to the 'driving force demand setting module' of the invention. The electronic control unit 340 executing the processing of steps S530 and S540 and the processing of step S520 and steps S550 to S590 in the drive control routine of FIG. 11 and the processing of steps S710 to S810, the processing of step S860, and the processing of steps S870, S880, and S790 in the torque decrease increase control routine of FIG. 13 in the second embodiment is equivalent to the 'controller' of the invention. The processing of steps S530 and S540 controls the motor 322 to ensure output of a torque equivalent to the set torque demand Td*. The processing of step S520 and steps S550 to S590 starts the torque decrease increase control routine of FIG. 13 on condition that the time duration tmd of the state having the torque demand Td* of higher than the reference value T1 exceeds the reference time tref1 in the vehicle stop state. The processing of steps S710 to S810 controls the motor 322 to decrease the output torque of the motor 322 by the torque decrease rate Rd1 or by the torque decrease rate Rd2 until the motor rotational position θm reaches or exceeds the reference rotation amount dθref under the condition of no substantial change in accelerator operation amount Acc. The processing of step S860 sets the torque increase rate Ri based on the condition-satisfying time accelerator opening Acci and the estimated gradient θ on condition that the motor rotational position θm reaches or exceeds the reference rotation amount dθref. The processing of steps S870, S880, and S790 sets the motor torque command Tm* to increase the output torque of the motor 322 by the torque increase rate Ri and controls the motor 322 with the motor torque command Tm*. The above mapping of the primary elements in the structure of the second embodiment to the primary constituents in the configuration of the invention does not restrict the constituents of the invention described in the section 'Disclosure of the Invention' in any sense but is only illustrative, since the second embodiment is only one concrete mode of carrying out the invention described in the section 'Disclosure of the Invention'. Namely the invention described in the section 'Disclosure of the Invention' is to be interpreted, based on the description of the section, and the second embodiment is to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

Industrial Applicability

The technique of the present invention is preferably applied to the manufacturing industries of vehicles and driving systems.

The invention claimed is:
1. A vehicle equipped with a motor arranged to output power to an axle, the vehicle comprising:
  an accelerator operation amount detector configured to detect a driver's accelerator operation amount;
  a decrease rate setting module configured to set a decrease rate of an output torque from the motor, based on the detected accelerator operation amount;

an increase rate setting module configured to set an increase rate of the output torque from the motor, based on the detected accelerator operation amount; and a controller configured to, on condition that there is no substantial change of the detected accelerator operation amount and that a predetermined torque decrease increase condition is satisfied in a vehicle stop state with output of a corresponding torque based on the detected accelerator operation amount from the motor, control the motor to decrease the output torque of the motor by the set decrease rate until a preset back motion of the vehicle and to increase the output torque of the motor up to the corresponding torque by the set increase rate after the preset back motion of the vehicle, wherein the decrease rate setting module sets the decrease rate to have an increasing tendency with an increase of the detected accelerator operation amount, and the increase rate setting module sets the increase rate to have an increasing tendency with an increase of the detected accelerator operation amount.

2. The vehicle in accordance with claim 1, wherein the decrease rate setting module sets the decrease rate to have an increasing tendency with an increase of the corresponding torque.

3. The vehicle in accordance with claim 1, wherein the predetermined torque decrease increase condition is that output of a torque of not lower than a preset reference torque from the motor continues for at least a predetermined time period.

4. The vehicle in accordance with claim 1, the vehicle further having: an internal combustion engine arranged to output power to the axle.

5. A driving system that is installed on a vehicle and equipped with a motor arranged to output power to an axle, the driving system comprising:

an accelerator operation amount detector configured to detect a driver's accelerator operation amount;

a decrease rate setting module configured to set a decrease rate of an output torque from the motor, based on the detected accelerator operation amount;

an increase rate setting module configured to set an increase rate of the output torque from the motor, based on the detected accelerator operation amount; and a controller configured to, on condition that there is no substantial change of the detected accelerator operation amount and that a predetermined torque decrease increase condition is satisfied in a vehicle stop state with output of a corresponding torque based on the detected accelerator operation amount from the motor, control the motor to decrease the output torque of the motor by the set decrease rate until a preset back motion of the vehicle and to increase the output torque of the motor up to the corresponding torque by the set increase rate after the preset back motion of the vehicle, wherein the decrease rate setting module sets the decrease rate to have an increasing tendency with an increase of the detected accelerator operation amount.

* * * * *

UNITED STATES PATENT AND TRADEMARK OFFICE
CERTIFICATE OF CORRECTION

PATENT NO.       : 8,600,594 B2                                              Page 1 of 1
APPLICATION NO.  : 12/515889
DATED            : December 3, 2013
INVENTOR(S)      : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1027 days.

Signed and Sealed this

Twenty-second Day of September, 2015

Michelle K. Lee
*Director of the United States Patent and Trademark Office*